(12) United States Patent
Rober et al.

(10) Patent No.: US 10,643,391 B2
(45) Date of Patent: May 5, 2020

(54) IMMERSIVE VIRTUAL DISPLAY

(71) Applicant: Apple Inc., Cupertino, CA (US)

(72) Inventors: Mark B. Rober, Sunnyvale, CA (US); Sawyer I. Cohen, Menlo Park, CA (US); Daniel Kurz, San Francisco, CA (US); Tobias Holl, Sunnyvale, CA (US); Benjamin B. Lyon, Saratoga, CA (US); Peter Georg Meier, Los Gatos, CA (US); Jeffrey M. Riepling, Clayton, CA (US); Holly Gerhard, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/713,428

(22) Filed: Sep. 22, 2017

(65) Prior Publication Data

US 2018/0089901 A1    Mar. 29, 2018

Related U.S. Application Data

(60) Provisional application No. 62/399,140, filed on Sep. 23, 2016.

(51) Int. Cl.
*G06T 19/00* (2011.01)
*G06F 3/00* (2006.01)
(Continued)

(52) U.S. Cl.
CPC ............ *G06T 19/006* (2013.01); *B60K 35/00* (2013.01); *B60K 37/06* (2013.01); *B60Q 9/00* (2013.01);
(Continued)

(58) Field of Classification Search
None
See application file for complete search history.

(56) References Cited

U.S. PATENT DOCUMENTS 9,459,692 B1 * 10/2016 Li ........................... G06F 3/012
2012/0105483 A1 * 5/2012 Fedorovskaya ...... G02B 27/017
345/660

(Continued)

FOREIGN PATENT DOCUMENTS

EP          2921938       9/2015

OTHER PUBLICATIONS

International Search Report and Written Opinion from PCT/US20017/053089, dated Jan. 5, 2018, Apple Inc., pp. 1-12.
U.S. Appl. No. 15/713,421, filed Sep. 27, 2017, Mark B. Rober.

*Primary Examiner* — Zhengxi Liu
(74) *Attorney, Agent, or Firm* — Robert C. Kowert; Kowert, Hood, Munyon, Rankin & Goetzel, P.C.

(57) ABSTRACT

A VR system for vehicles that may implement methods that address problems with vehicles in motion that may result in motion sickness for passengers. The VR system may provide virtual views that match visual cues with the physical motions that a passenger experiences. The VR system may provide immersive VR experiences by replacing the view of the real world with virtual environments. Active vehicle systems and/or vehicle control systems may be integrated with the VR system to provide physical effects with the virtual experiences. The virtual environments may be altered to accommodate a passenger upon determining that the passenger is prone to or is exhibiting signs of motion sickness.

20 Claims, 20 Drawing Sheets

(51) Int. Cl.

| | | |
|---|---|---|
| *B60R 1/00* | (2006.01) | |
| *B60Q 9/00* | (2006.01) | |
| *B60W 50/08* | (2020.01) | |
| *B60W 10/04* | (2006.01) | |
| *B60W 10/18* | (2012.01) | |
| *B60W 10/20* | (2006.01) | |
| *B60W 10/22* | (2006.01) | |
| *G06F 3/01* | (2006.01) | |
| *G06K 9/00* | (2006.01) | |
| *B60K 35/00* | (2006.01) | |
| *B60K 37/06* | (2006.01) | |
| *G06T 13/40* | (2011.01) | |
| *G05D 1/00* | (2006.01) | |
| *G06F 3/0481* | (2013.01) | |

(52) U.S. Cl.
CPC .............. *B60R 1/00* (2013.01); *B60W 10/04* (2013.01); *B60W 10/18* (2013.01); *B60W 10/20* (2013.01); *B60W 10/22* (2013.01); *B60W 50/08* (2013.01); *G06F 3/011* (2013.01); *G06F 3/012* (2013.01); *G06F 3/016* (2013.01); *G06K 9/00671* (2013.01); *G06K 9/00791* (2013.01); *G06K 9/00832* (2013.01); *G06T 13/40* (2013.01); *B60K 2370/177* (2019.05); *B60R 2300/207* (2013.01); *B60R 2300/60* (2013.01); *B60W 2540/22* (2013.01); *G05D 1/0088* (2013.01); *G06F 3/0481* (2013.01); *G06K 9/00335* (2013.01)

(56) References Cited

U.S. PATENT DOCUMENTS

| | | | |
|---|---|---|---|
| 2015/0100179 A1* | 4/2015 | Alaniz | A63F 13/00 |
| | | | 701/1 |
| 2015/0269780 A1 | 9/2015 | Herman et al. | |
| 2016/0048027 A1* | 2/2016 | Shpigelman | G06T 15/00 |
| | | | 345/156 |
| 2016/0091877 A1 | 3/2016 | Fullam | |
| 2016/0167672 A1* | 6/2016 | Krueger | H04N 13/366 |
| | | | 340/576 |
| 2017/0136842 A1* | 5/2017 | Anderson | B60G 17/016 |
| 2018/0040163 A1* | 2/2018 | Donnelly | G06T 19/006 |

\* cited by examiner

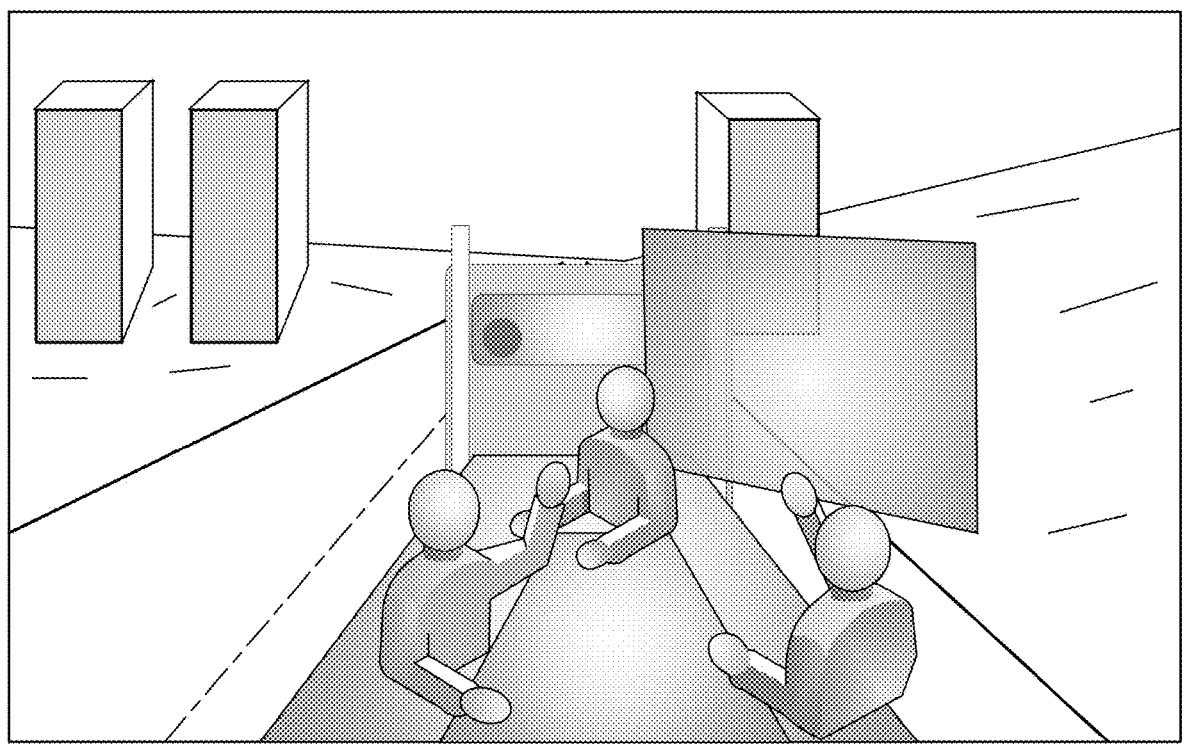
(A)
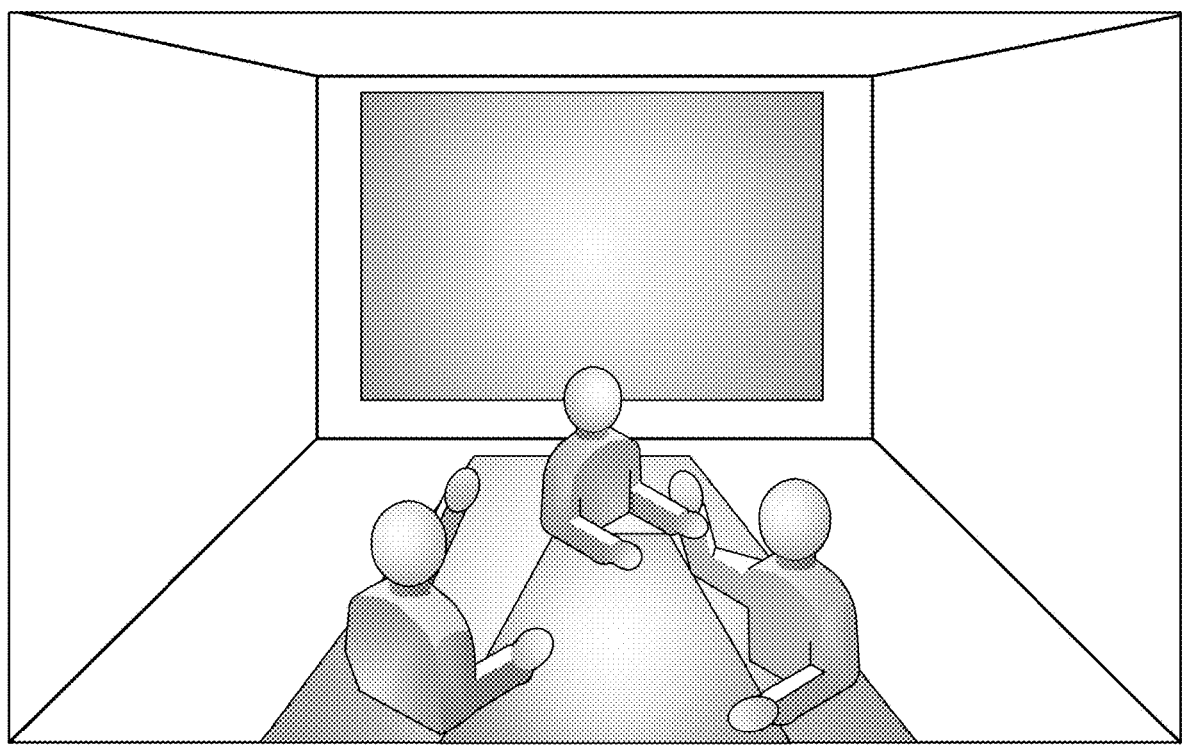
(B)
FIG. 9

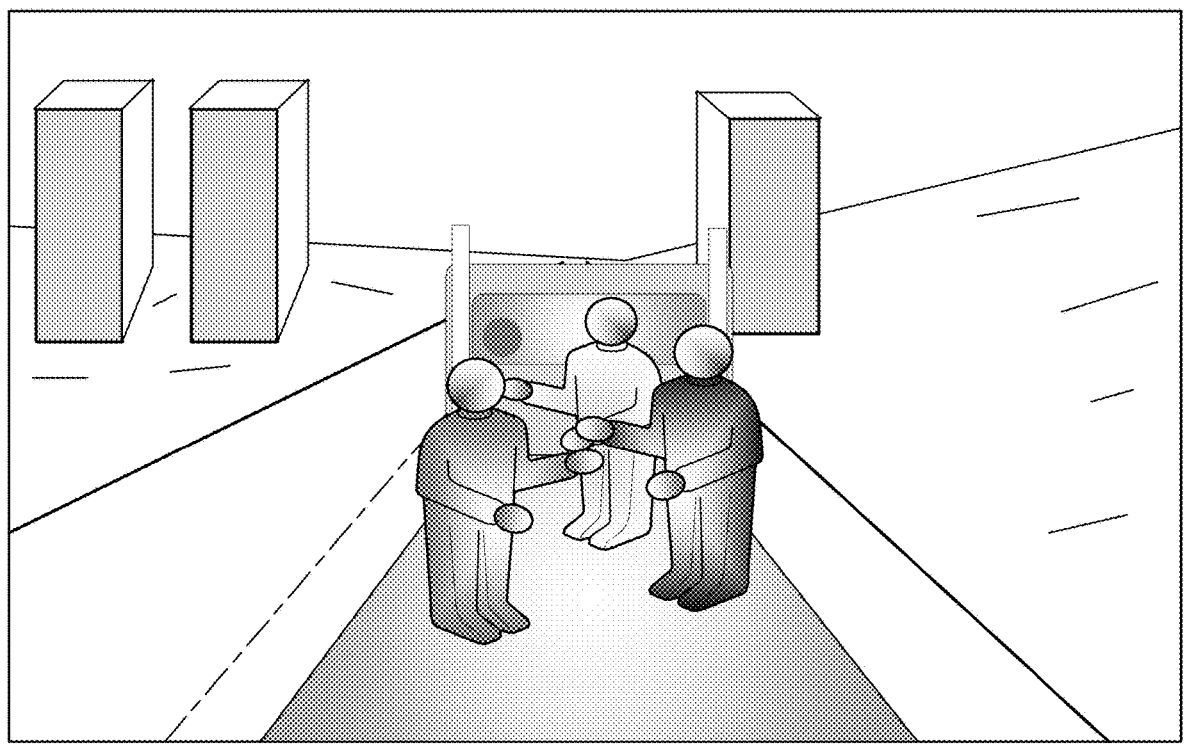
(A)
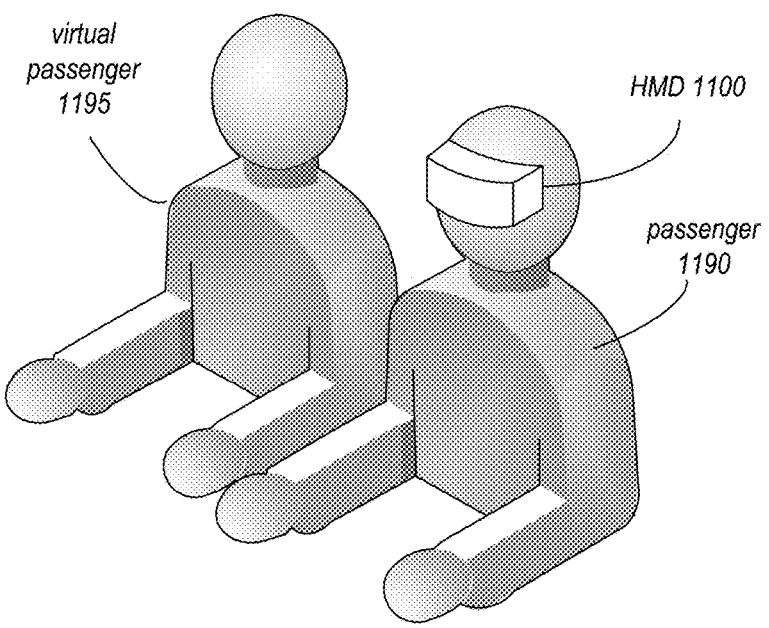
(B)
FIG. 11

IMMERSIVE VIRTUAL DISPLAY

PRIORITY INFORMATION

This application claims benefit of priority to U.S. Provisional Application No. 62/399,146, filed Sep. 23, 2016, titled "Immersive Virtual Display," which is hereby incorporated by reference in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world.

SUMMARY

Various embodiments of methods and apparatus for providing enhanced virtual reality (VR) and/or mixed reality (MR) experiences for passengers in vehicles are described. Embodiments of a VR system are described that may implement VR methods, for example to address problems with vehicles in motion that may result in motion sickness for the passengers. Embodiments of the VR system may provide immersive VR experiences to passengers in vehicles, for example by replacing the view of the real world with any of various types of virtual experiences and environments that a passenger may desire. Vehicle motions may be integrated into the virtual experiences to help prevent motion sickness. In some embodiments, active vehicle systems and/or vehicle control systems within constraints, may be integrated with the VR system to provide physical effects with the virtual experience, for example rushing wind or heat through the HVAC system, surround sound and sound effects through the audio system, and acceleration or motion effects through the seat.

In addition to reducing motion sickness, embodiments of the VR system may provide enhanced immersive virtual experiences to passengers in moving vehicles that are not achievable in conventional stationary VR systems. Integrating the VR system with a vehicle in motion provides opportunities for enhancing virtual experiences that are not available while sitting in a room using a stationary simulator or wearing a HMD. For example, accelerations and motions in a virtual experience can be matched to or enhanced by accelerations and motions of the vehicle, and thus do not have to be simulated using gravity vectors as in a stationary simulator In some embodiments, a VR system may include at least one VR controller that generates virtual content for projection to passengers, and at least one VR projection or display device such as a headset, helmet, goggles, or glasses (referred to herein as a head-mounted display (HMD)) that includes a projector mechanism for projecting or displaying frames including left and right images to a passenger's eyes to thus provide 3D virtual views to the passenger. Alternatively, in some embodiments, a VR system may include at least one VR controller that generates virtual content for projection to passengers, and at least one projector mechanism for projecting or displaying virtual frames to at least one window of the vehicle to thus provide 3D virtual views to passengers. In either case, the 3D virtual views may include views of the passenger's environment, including the environment outside the vehicle, augmented with virtual content (e.g., virtual objects, virtual tags, etc.), or alternatively may provide immersive VR environments that may include visual cues of the environment outside the vehicle.

Embodiments of the VR system may integrate inputs from a number of sources, including but not limited to vehicle internal and external sensors (e.g., depth cameras (e.g., LiDAR) and video cameras), vehicle and HMD inertial-measurement units (IMUs), vehicle control systems such as throttle control, braking, steering, navigation, and active suspension systems, world maps, 3D models, video, audio, and other information from external sources such as cloud-based storage or network-based applications, video or audio inputs from vehicle AV systems, and user devices such as notebook computers, tablets, or smartphones, to generate immersive virtual content for output through HMDs or other VR projection systems. In some embodiments, the VR system may also generate signals to the vehicle control systems (e.g., to control braking, acceleration, steering, or suspension/motion within constraints) and vehicle active systems (e.g., audio and HVAC systems, and active seats) to provide physical effects synchronized with the projected virtual content to further enhance the passenger's experience.

Some passengers may tend to experience motion sickness more than others when using a VR system in a moving vehicle. In some embodiments, the VR system may adapt the VR environment and experience to accommodate different passengers' preferences and tendencies. For example, visual cues that indicate flow past a passenger may be slowed down or sped up when compared to the actual speed or acceleration of the vehicle to accommodate different passengers' preferences and tendencies. In some embodiments, the VR system may monitor a passenger for signs of discomfort or motion sickness. If signs of motion sickness are detected, the VR system may adapt the virtual environment to mitigate motion sickness, for example by slowing down the visual cues so that there is a 1:1 mapping ratio to actual vehicle speed or acceleration. In addition to adapting the mapping ratio for passengers to help prevent motion sickness, one or more other visual and audio techniques or cues (referred to as accommodations) may be used in VR experiences to increase the comfort of and mitigate motion sickness for passengers using the VR system in a vehicle.

BRIEF DESCRIPTION OF THE DRAWINGS

FIGS. 9 through 11 illustrate several example VR experiences that may be provided by embodiments of a VR system, and are not intended to be limiting.

Figure 1:
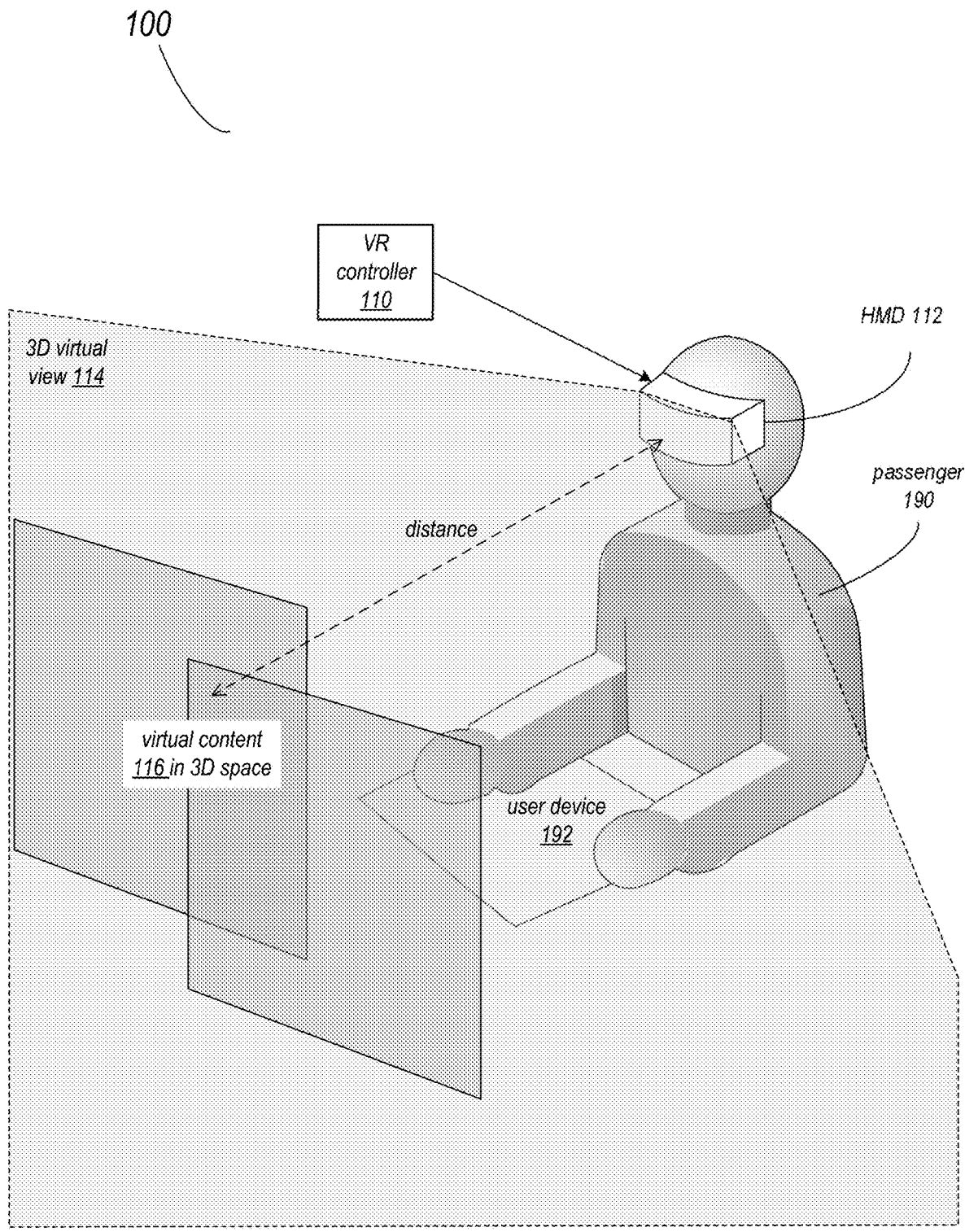
FIG. 1 illustrates a virtual reality (VR) system including a head mounted device (HMD) that may be used by passengers in vehicles, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of methods and apparatus for providing enhanced virtual reality (VR) experiences for passengers in vehicles are described. While embodiments are generally referred to herein as a VR system including VR controllers and VR projection devices that provides enhanced VR experiences for passengers in vehicles, note that some embodiments of a VR system may instead or also provide mixed reality (MR) experiences for passengers in vehicles.

The term "vehicle" as used herein generally refers to passenger vehicles. Similarly, "passenger" as used herein generally refers to occupants of a vehicle. Embodiments of the VR system as described herein may, for example, be implemented in autonomous or "self-driving" vehicles where all occupants are passengers. However, note that embodiments may also be implemented in conventional vehicles, where one occupant is the driver, within constraints. Further, embodiments may be implemented in other types of surface transportation, for example buses and trains, and may also be adapted for use in airplanes, helicopters, boats, ships, etc. The term "vehicle" as used herein encompasses all of these use cases. Also note that embodiments are generally described as providing enhanced VR experiences for passengers in moving vehicles. However, in some embodiments, the VR system may be used in stationary vehicles to provide interesting VR experiences to users. Further, in some embodiments, enhanced VR experiences in moving vehicles provided by the VR system may be recorded for later playback by the person that had the original experience or by others, for example while sitting in a living room, or while following a similar route that can be mapped to the experience. In addition, in some embodiments, two or more passengers in a vehicle, or one or more passengers in a vehicle and one or more persons at other locations such as an office or a home, may participate in a virtual environment using the VR system.

Many passengers in vehicles may experience motion sickness. Typically, this is not the case for the driver. However, with the arrival of autonomous vehicles, the driver becomes a passenger, and thus may want to occupy themselves while, for example, riding to work. Passengers in conventional or autonomous vehicles may, for example, want to read a book, or work on their notebook computer. However, many passengers in vehicles may experience motion sickness if trying to read or work on a computer because the vestibular sense of motion does not correspond to the visual motion experienced, e.g. the vestibular organ reports that the passenger is experiencing the accelerations of the vehicle whereas the visual sense, which is mostly engaged by the imagery of the book or computer screen, reports that the passenger is not moving or moving very differently than the vehicle is. Most of their vision is filled with objects that are not moving (e.g., a book or computer screen), whereas their vestibular sense reports acceleration. Another physiological effect that may contribute to motion sickness is if a passenger's head is tilted to the side, down, or back when going around the curve or during other vehicle rotations; the passenger may experience different and disorienting signals in response to the motion from the body's visual and vestibular systems.

With the arrival of VR systems such as head-mounted displays (HMDs), passengers may want to enjoy a VR experience while riding in a vehicle. However, conventional VR systems may also cause motion sickness in moving vehicles, as the person's body experiences different motions than what they are visually seeing. Further, many people experience motion sickness for similar reasons sitting in a rear seat of a vehicle, as their eyes may focus on the interior of the car and thus the motions they experience may not match what they are visually seeing, as they cannot see the forward view out of the vehicle well if at all. This problem may be worse for passengers riding in rear-facing seats, for example as may be provided in autonomous vehicles. Further, autonomous vehicles may have limited or even no windows, and thus the motions that passengers experience in such vehicles may not match what they are visually seeing, potentially causing motion sickness.

Embodiments of a VR system are described that may implement VR methods to address these and other problems with vehicles in motion that may result in motion sickness for the passengers. Embodiments of the VR system may, for example, provide augmented or virtual views that help to match visual cues with the motions that a passenger in a moving vehicle is experiencing. In addition, embodiments of the VR system may project content that a passenger may want to view or read such as computer screens, books, or video as virtual content at a distance from the viewer (e.g., outside and some distance in front of the vehicle) so that the virtual content appears as a distant object stabilized or fixed in the external environment while visual cues of the real environment are moving in the field of view of the passenger, allowing the passenger to work, view, or read in comfort without experiencing motion sickness as may occur if the passenger was trying to work or view the content on a physical screen on a portable computing device sitting on their lap, or read a physical book or paper. Thus, embodiments of the VR system may aid in productivity, as passengers in vehicles may more comfortably perform work while riding in the vehicle.

As described above, embodiments of the VR system may project virtual content for viewing at a distance from the passenger (e.g., outside and some distance in front of the vehicle) so that the virtual content appears as a distant object stabilized or fixed in the external environment while visual cues of the real environment are moving in the field of view of the passenger. In some embodiments, these visual cues may pass at a 1:1 mapping ratio to the actual speed or acceleration of the vehicle. However, in some embodiments the visual cues may be slowed down or sped up when compared to the actual speed or acceleration of the vehicle, which may, for example, help in mitigating motion sickness, or be used to provide other effects or sensations to a passenger. For example, maintaining a 1:1 mapping ratio, or slowing down the visual cues, may help in mitigating motion sickness for a passenger who is prone to or exhibits signs of motion sickness. As another example, for a passenger who is not prone to or does not exhibit signs of motion sickness, the visual cues may be sped up, for example to a 1:2 mapping ratio, to provide an enhanced, more exciting virtual experience to the passenger.

In some embodiments, a VR system may include at least one VR controller that generates virtual content for projection to passengers, and at least one VR projection device such as a headset, helmet, goggles, or glasses (referred to herein as a head-mounted display (HMD)) that includes a projector mechanism for projecting or displaying frames including left and right images to a passenger's eyes to thus provide 3D virtual views to the passenger. If there are two or more passengers in the vehicle, the VR system may include more than one HMD; each passenger may wear a HMD that is controlled by the VR controller. Alternatively, in some embodiments, a VR system may include at least one VR controller that generates virtual content for projection to passengers, and at least one projector mechanism for projecting or displaying frames including the virtual content to a window of the vehicle to thus provide 3D virtual views to passengers. In either case, the 3D virtual views may include views of the passenger's environment, including the environment outside the vehicle, augmented with virtual content (e.g., virtual objects, virtual tags, etc.), or alternatively may provide immersive VR environments that may include visual cues of the environment outside the vehicle.

Embodiments of the VR system may integrate inputs from a number of sources, including but not limited to vehicle internal and external sensors (e.g., depth cameras (e.g., LiDAR) and video cameras), vehicle and HMD inertial-measurement units (IMUs), vehicle control systems such as throttle control, braking, steering, navigation, and active suspension systems, world maps, 3D models, video, audio, and other information from external sources such as cloud-based storage or network-based applications, video or audio inputs from vehicle AV systems, inputs from applications on mobile multipurpose devices such as smartphones connected to vehicle AV systems, inputs from devices connected to the vehicle's OBD-II port, and user devices such as notebook computers, tablets, or smartphones, to generate augmented or immersive virtual content for output through HMDs or other VR projection systems. In some embodiments, the VR system may also generate signals to the vehicle control systems (e.g., to control braking, acceleration, steering, or suspension/motion within constraints) and vehicle active systems (e.g., audio and HVAC systems, and active seats) to provide physical effects synchronized with the projected virtual content to further enhance the passenger's experience. When rendering virtual content for display, the VR system may synchronize motions and accelerations of the virtual content with motions and accelerations of the vehicle along a route in the real world being traveled by the vehicle based on the inputs from one or more of the sources in the vehicle.

In addition to addressing the problem of motion sickness for passengers in moving vehicles and in providing benefits such as improved productivity to passengers in moving vehicles, embodiments of the VR system may provide immersive VR experiences to passengers in vehicles, for example by replacing the view of the real world with any of various types of virtual experiences and environments that a passenger may desire. Vehicle motions may be integrated into the virtual experiences to help prevent motion sickness or to enhance the virtual experience. Integrating the VR system with a vehicle in motion provides opportunities for enhancing virtual experiences that are not available while sitting in a room using a stationary simulator or wearing a HMD. For example, accelerations and motions in a virtual experience can be matched to or enhanced by accelerations and motions of the vehicle. In some embodiments, active vehicle systems (e.g., HVAC systems, audio systems, and active seats) and/or vehicle control systems (e.g., braking, throttle, steering, and active suspension systems) within constraints, may be integrated with the VR system to provide physical effects with the virtual experience, for example rushing wind or heat through the HVAC system, surround sound and sound effects through the audio system, and acceleration or motion effects through the seat. Passengers may choose to have relaxing virtual experiences while riding in a vehicle such as floating down a river or soaring over the landscape in a hang glider, or exciting virtual experiences such as a car chase or driving through a post-apocalyptic wasteland with zombies attacking, or anything in between. Passengers may choose to have the virtual experience of riding through another real location, such as the streets of London, or through fictional cities or landscapes. The virtual experiences may be educational and interactive, for example allowing the passenger to discover history or other information about landmarks in a virtual view of a city that they are experiencing. The virtual experiences may be interactive in other ways, for example allowing a passenger to pass other vehicles during a road race experience, or run over zombies in a post-apocalyptic landscape. As another example, if the vehicle stops at a red light or for some other reason when fleeing zombies in a post-apocalyptic landscape, the virtual experience may cause the vehicle to appear to stall and not allow the car to be restarted until the light turns green to build suspense.

In some embodiments, virtual views of real or fictional people may be integrated into the virtual experience provided by the VR system. For example, a virtual representation of an author or talk show host may appear to be sitting in the seat next to the passenger; the virtual author may be reading one of their books to the passenger, or the virtual talk show host may be hosting their show from the seat next to the passenger, with their voices provided through the audio system. As another example, the passenger may experience riding on a flatbed truck with a band playing a gig on the flatbed, with the band's music provide through the audio system.

In some embodiments, two or more passengers in a car may participate in the same virtual experience. For example, four passengers may each wear a HMD that projects a view as if the passengers are on a giant hang glider floating above a landscape or city. The virtual experience for the passengers may be interactive; for example, the passengers may drop virtual water balloons onto features in the environment.

In some embodiments, immersive VR experiences may be used to enhance productivity while riding in vehicles, while also providing an interesting VR experience for participants. For example, two or more people may hold a meeting as avatars around a table in a virtual environment, for example in a virtual room or on the bed of a flatbed truck. Alternatively, different ones of the participants may experience different VR environments for a meeting; for example, to one participant, it may appear as if they are meeting on the flatbed of a truck, while to another it may appear that they are meeting in a room at the office. The participants may be in the same vehicle, or in different vehicles, on the way to or from work. Or some of the participants may be in vehicles on the way to or from work, while one or more others are already at the office, or at home, or at other locations. A view of one of the participant's computer screens may be projected into the virtual environment for all of the participants to view. In some embodiments, the participants have different virtual experiences based on their actual environment. For example, a participant that is already in the office may view the meeting in a simulated office environment, while participants still in their vehicles may view the meeting on the bed of a virtual flatbed truck. For participants in different vehicles, the virtual experiences may differ according to the different routes they follow in the real environment.

In some embodiments, VR systems in two or more autonomous vehicles may be used to provide interesting interactive experiences to passengers in the different vehicles. For example, the autonomous vehicles may be taken to a track or a large open lot, and the VR systems may be used to provide a virtual experience of a race to the passengers. The VR systems may direct control systems of the vehicles (e.g., steering, braking, throttle, active suspension) within constraints to drive around on the track or in the lot, while providing a visual, audio, and tactile VR experience to the passengers in the vehicles. For example, it may seem to a passenger visually, audibly, and through physical inputs generated by the VR system in the vehicle that he is sitting in a race car, with the other vehicles shown as other race cars, participating in a race. As another example, it may seem to the passenger that they are participating in a scene from an actual movie.

The above provides just some examples of different augmented or immersive virtual experiences that may be provided by, and uses for, a VR system as described herein, and is not intended to be limiting.

FIG. 1 illustrates a virtual reality (VR) system including a head mounted device (HMD) that may be used by passengers in vehicles, according to some embodiments. In these embodiments, a VR system 100 in a vehicle includes a VR controller 110 (e.g., mounted under the dash) and a VR headset (HMD 112). HMD 112 may implement any of various types of virtual reality projection technologies. For example, HMD 112 may be a near-eye VR system that projects left and right images on screens in front of the user 190's eyes that are viewed by the passenger 190, such as DLP (digital light processing), LCD (liquid crystal display) and LCoS (liquid crystal on silicon) technology VR systems. As another example, HMD 112 may be a direct retinal projector system that scans left and right images, pixel by pixel, to the passenger 190's eyes. To scan the images, left and right projectors generate beams that are directed to left and right reflective components (e.g., ellipsoid mirrors, or holographic combiners) located in front of the user 190's eyes; the reflective components direct the beams to the user's eyes. To create a three-dimensional (3D) effect, virtual content 116 at different depths or distances in the 3D virtual view 114 are shifted left or right in the two images as a function of the triangulation of distance, with nearer objects shifted more than more distant objects.

The passenger 190 may wear the HMD 112 while, for example, working on a user device 192 (e.g., a notebook or laptop computer). Controller 110 and HMD 112 may be communicatively coupled via a wired (e.g., the user may plug the HMD 112 into a port (e.g., USB port) on the seat or console) or wireless (e.g., Bluetooth) connection. Controller 110 and user device 192 may also be communicatively coupled via a wired (e.g., the user may plug the user device 192 into a port (e.g., USB port) on the seat or console) or wireless (e.g., Bluetooth) connection. Video output from the user device 192 may be provided to the VR controller 110, which may then generate virtual content including output from the device 192 (e.g. windows) in frames that are provided to the HMD 112. The HMD 112 may project the frames for viewing by the passenger 190. In some embodiments, the frames may be projected in a mixed or augmented reality view so that the passenger 190 sees the virtual content 116 in a view of the real environment, or alternatively may be projected into a virtual environment with other virtual content. If projected in a view of the real environment, the virtual content 116 may appear to be fixed at some distance in front of the vehicle (e.g., a few meters, or even appearing as a giant display at the horizon), to mitigate effects that may cause motion sickness. If projected into a virtual environment, the virtual content 116 may appear to be fixed at some distance in front of the passenger 190, and visual cues may be provided (e.g., virtual markers moving past the passenger 190) to mitigate effects that may cause motion sickness.

Figure 2:
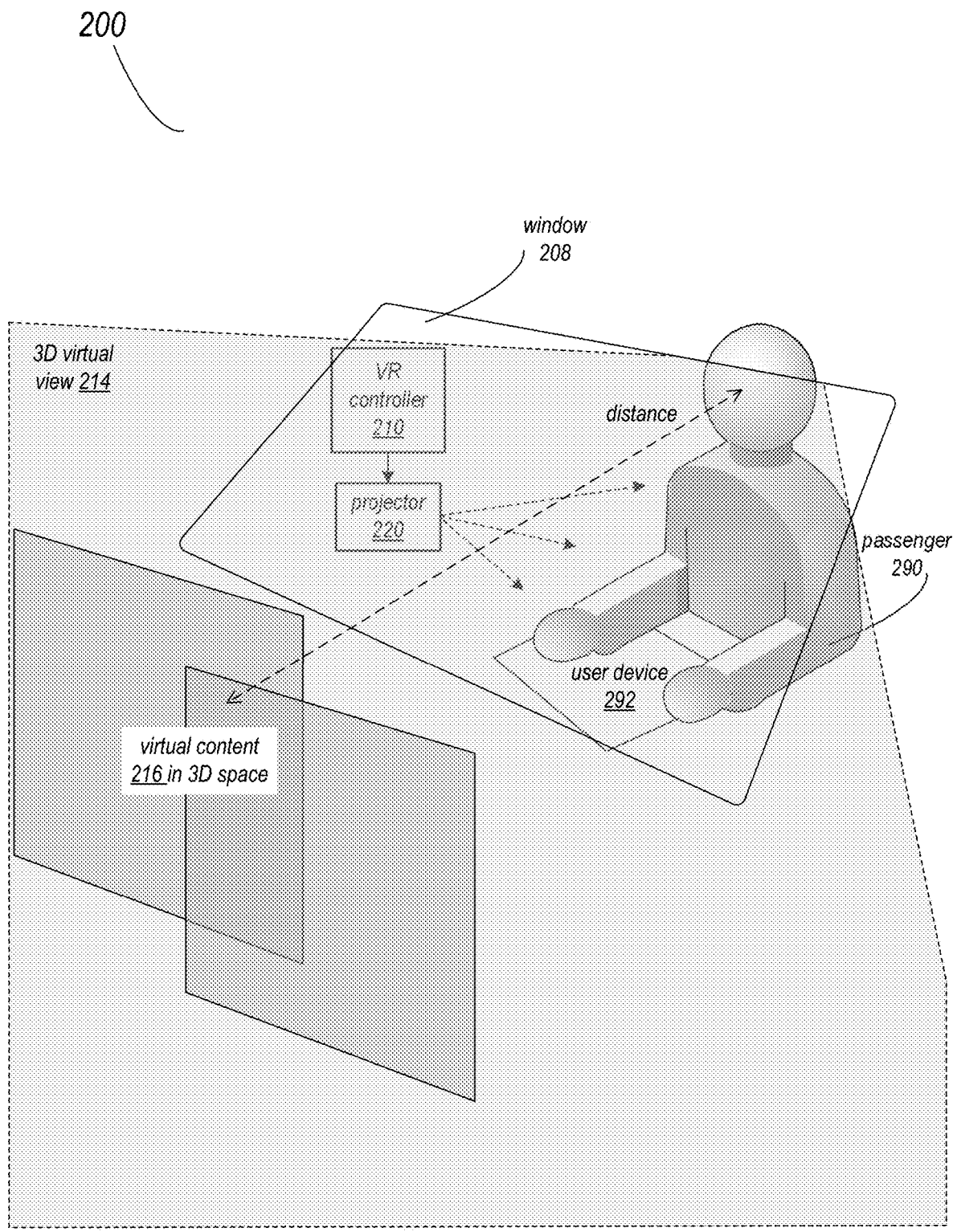
FIG. 2 illustrates a VR system that projects VR content to a window of a vehicle for viewing by passengers, according to some embodiments.

FIG. 2 illustrates a VR system that projects VR content to a window of a vehicle for viewing by passengers, according to some embodiments. In these embodiments, a VR system 200 in a vehicle includes a VR controller 210 (e.g., mounted under the dash) and a projector 220 system configured to project virtual content onto a window 208 (e.g., the windshield of the vehicle). In some embodiments, window 208 may include a technology such as waveguide technology or holographic combiner technology to improve projection over what can be achieved by projecting light onto a conventional glass window. The passenger 290 may work on a user device 292 (e.g., a notebook or laptop computer). Controller 210 and projector 220 may be communicatively coupled via a wired or wireless (e.g., Bluetooth) connection. Controller 210 and user device 292 may also be communicatively coupled via a wired (e.g., the user may plug the user device 292 into a port (e.g., USB port) on the seat or console) or wireless (e.g., Bluetooth) connection. Video output from the user device 292 may be provided to the VR controller 210, which may then generate virtual content including output from the device 292 (e.g. windows) in frames that are provided to the projector 220. The HMD 220 may project the frames onto the window 208 for viewing by the passenger 290. In some embodiments, the frames may be projected in a mixed or augmented reality view 214 so that the passenger 290 sees the virtual content 216 in a view of the real environment out the window 208, or alternatively may be projected into a virtual environment with other virtual content. If projected in a view of the real environment, the virtual content 216 may appear to be fixed at some distance in front of the vehicle (e.g., a few meters, or even appearing as a giant display at the horizon), to mitigate effects that may cause motion sickness. If projected into a virtual environment, the virtual content 216 may appear to be fixed at some distance in front of the passenger 290, and visual cues may be provided (e.g., virtual markers moving past the passenger 290) to mitigate effects that may cause motion sickness.

While FIG. 2 shows projection onto a window 208 such as the windshield of a vehicle, in some embodiments one or more projectors 220 may be used to project virtual content generated by the VR controller 210 to one or more other windows in a vehicle (e.g., to a side or door window, or rear window), or to all windows in a vehicle to provide a "wrap around" virtual experience. Also note that, in some embodiments, instead of or in addition to displaying virtual content on window(s) of the vehicle, one or more display screens in the vehicle may be used to display virtual content generated by the VR controller 210.

Figure 3:
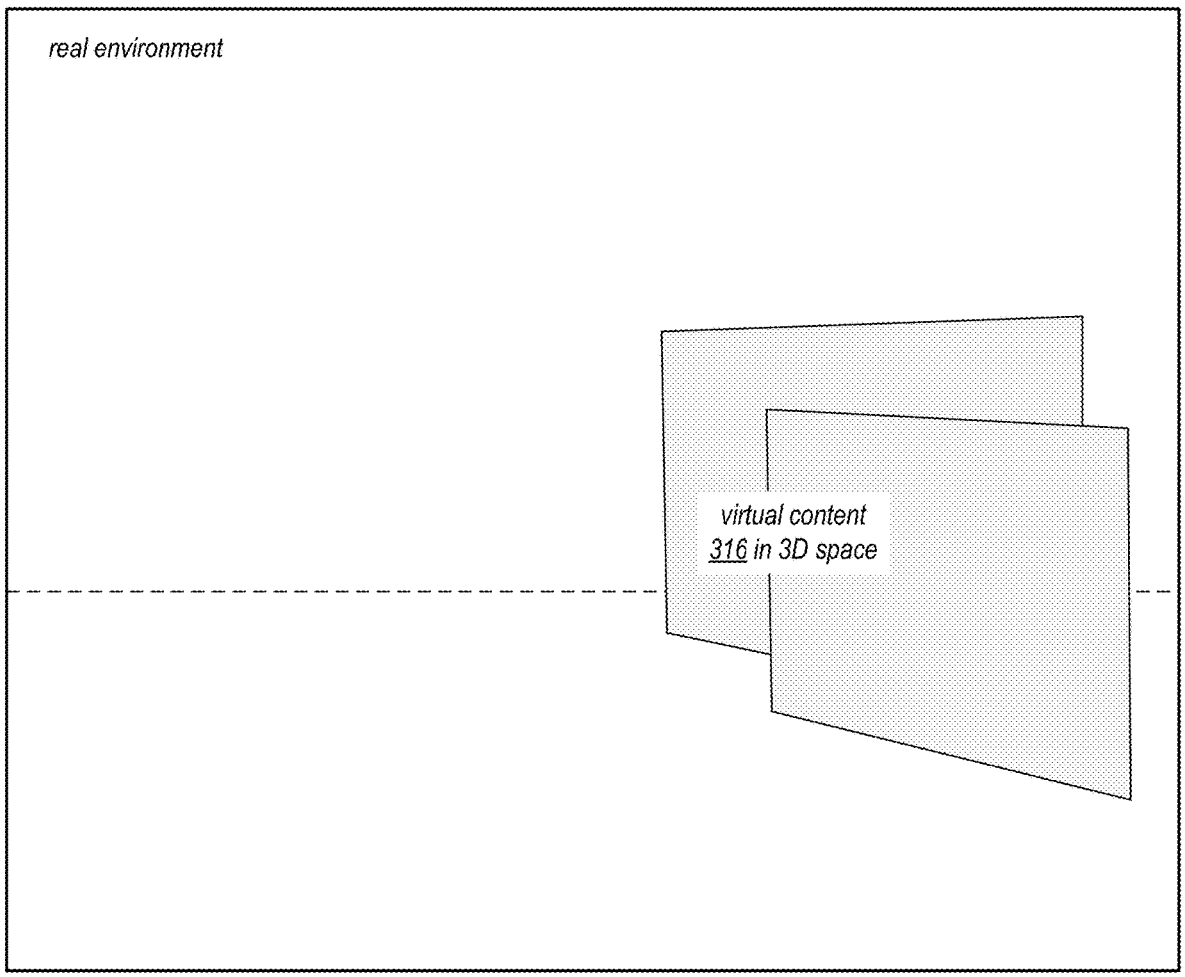
FIG. 3 illustrates projecting VR content so that it appears to the viewer to be in space in front of the vehicle, according to some embodiments.

FIG. 3 illustrates projecting VR content 316 so that it appears to the viewer to be fixed in space in the real environment at some distance in front of the vehicle, according to some embodiments. As shown in FIG. 3, virtual content 316 (e.g., projections of the display or portions of a display of a computing device that the passenger is holding) may appear to the passenger to be fixed at some distance in front of the vehicle (e.g., a few meters, or even appearing as a giant display at the horizon), for example to mitigate effects that may cause motion sickness. In some embodiments, virtual content 316 may be partially transparent so that the passenger may view the scene behind the content 316. Virtual content 316 may include, but is not limited to, various display windows (e.g., directories, browsers, web pages, productivity tools (e.g., word processors), email applications or email messages, messaging applications, game windows, video (e.g., video from a video streaming application), etc. While embodiments are described as displaying virtual content 316 input from a passenger's personal device such as a notebook computer, note that content from other sources, for example video or other content from a DVD or BluRay® player of the vehicle's AV system, or video or other content from an external (e.g., network-based) source, may instead or also be displayed.

Figure 4:
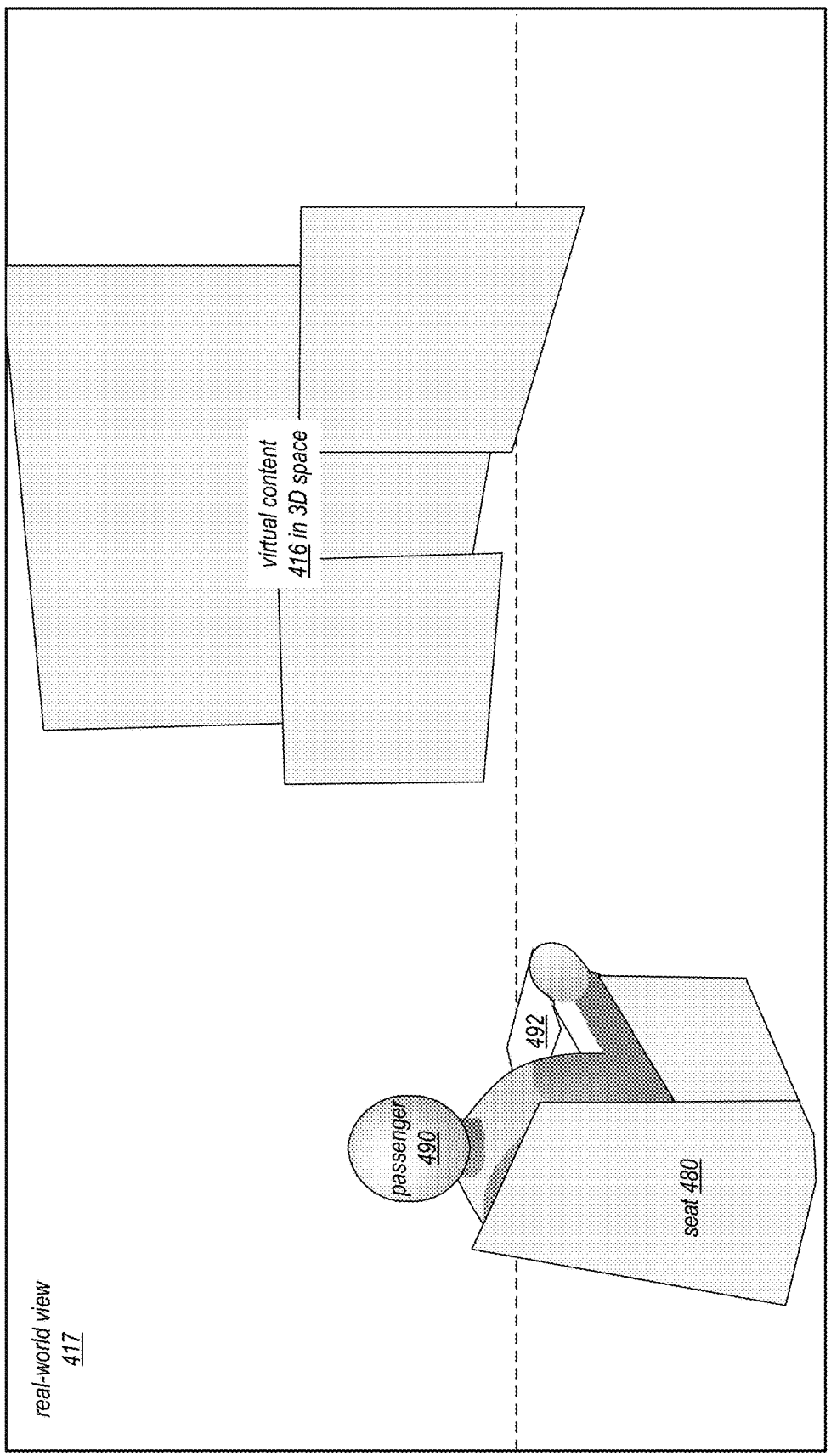
FIG. 4 illustrates projecting VR content so that it appears to the viewer to be in space in a real world view from the vehicle, according to some embodiments.

FIG. 4 illustrates projecting VR content so that it appears to the viewer to be in space in a real world view from the vehicle, according to some embodiments. A passenger 490 may be seated in a seat 480 of a vehicle. A VR system as illustrated in FIG. 1 or 2 may project virtual content 416 into a real world view 417 in front of or around the vehicle. In some embodiments, the real world view 417 may be provided through the windows of the vehicle. Alternatively, in some embodiments, the real world view 417 may be provided by video cameras on the vehicle; the VR system may composite the virtual content 416 with video of the real world around or in front of the vehicle and provide the composited video to a HMD or projector for display to the passenger 490. As shown in FIG. 4, virtual content 416 (e.g., projections of the display of a computing device 492 that the passenger is holding) may appear to the passenger 490 to be fixed at some distance in front of the vehicle (e.g., a few meters, or even appearing as a giant display at the horizon), for example to mitigate effects that may cause motion sickness.

Figure 5:
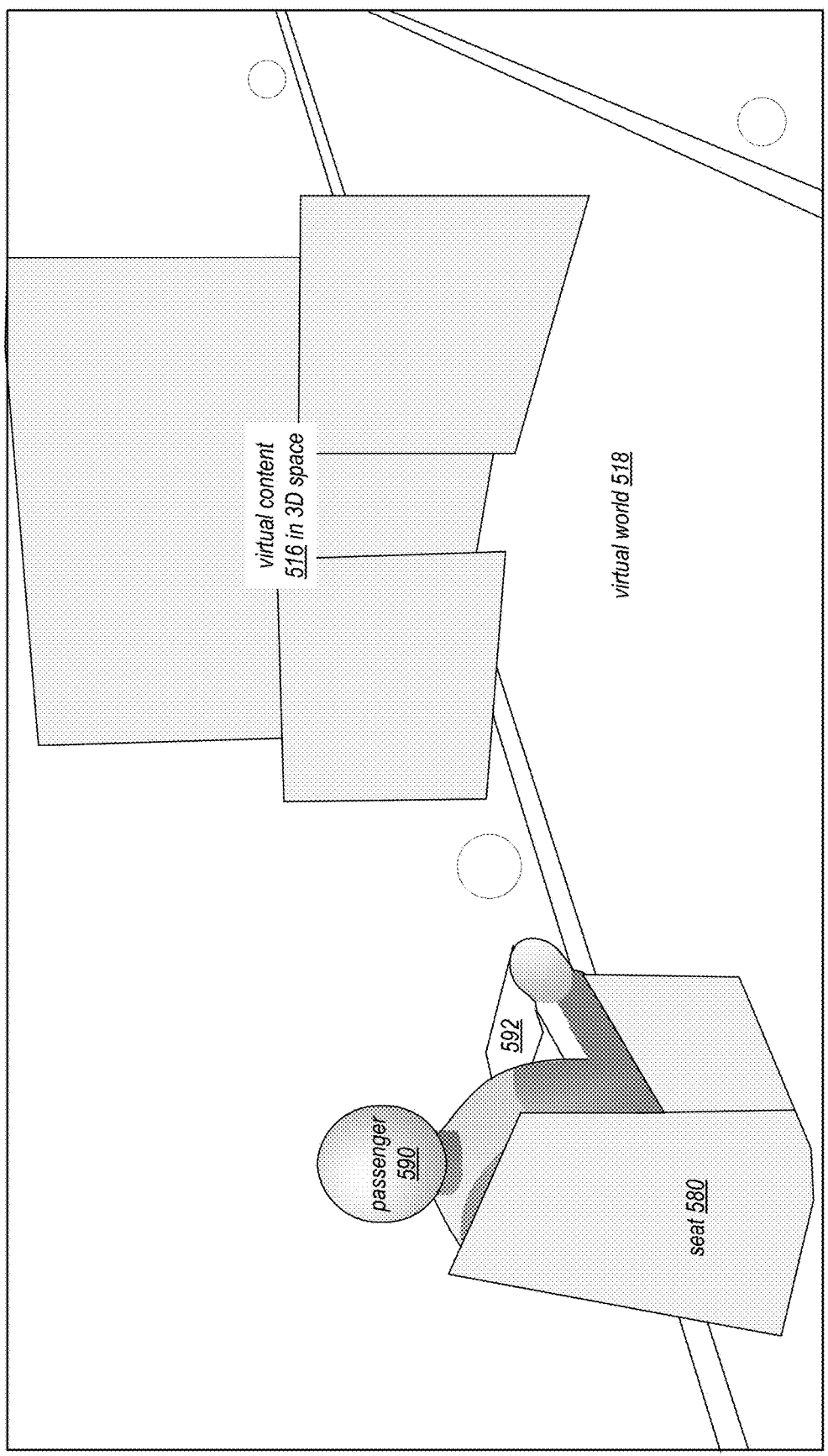
FIG. 5 illustrates projecting VR content so that it appears to the viewer to be in space in a simulated view from the vehicle, according to some embodiments.

FIG. 5 illustrates projecting VR content so that it appears to the viewer to be in space in a simulated view from the vehicle, according to some embodiments. A passenger 590 may be seated in a seat 580 of a vehicle. A VR system as illustrated in FIG. 1 or 2 may generate frames representing a virtual world 518 that includes virtual content 516 and that replaces the real world view, and provide the frames to a HMD or projector for display to the passenger 590. As shown in FIG. 5, virtual content 516 (e.g., projections of the display of a computing device 592 that the passenger is holding) may appear to the passenger 590 to be fixed at some distance in front of the passenger (e.g., a few meters, or even appearing as a giant display at the horizon), for example to mitigate effects that may cause motion sickness. In some embodiments, visual cues may be included in the virtual world (e.g., virtual objects that appear to be moving past the passenger 590) to help mitigate motion sickness, or to provide an interesting visual experience. While not shown, in some embodiments a virtual vehicle interior may be included in the virtual world; the virtual vehicle interior can be made to represent any type of vehicle that the passenger 590 wants to see, for example an exotic supercar, convertible, or luxury car. Other types of virtual vehicles, such as motorcycles or helicopters, may also be rendered to provide interesting or exciting experiences to the passenger 590.

In some embodiments, virtual representations of the passenger 590's hands and the user device 592 (e.g., keyboard) may also be shown in the virtual content 516 to assist the passenger 590 when using the device 592. In some embodiments, a virtual representation of the passenger 590, including but not limited to the person's arms, hands and legs, may also be shown in the virtual content 516. The virtual representation of the passenger 590 may be rendered to match a particular virtual experience. For example, if the user is experiencing a virtual tour of Rome while riding in a virtual chariot, in addition to showing the chariot and horses, the virtual representation may show the person wearing a toga and sandals, with Roman jewelry rendered on their arms and hands.

Figure 6:
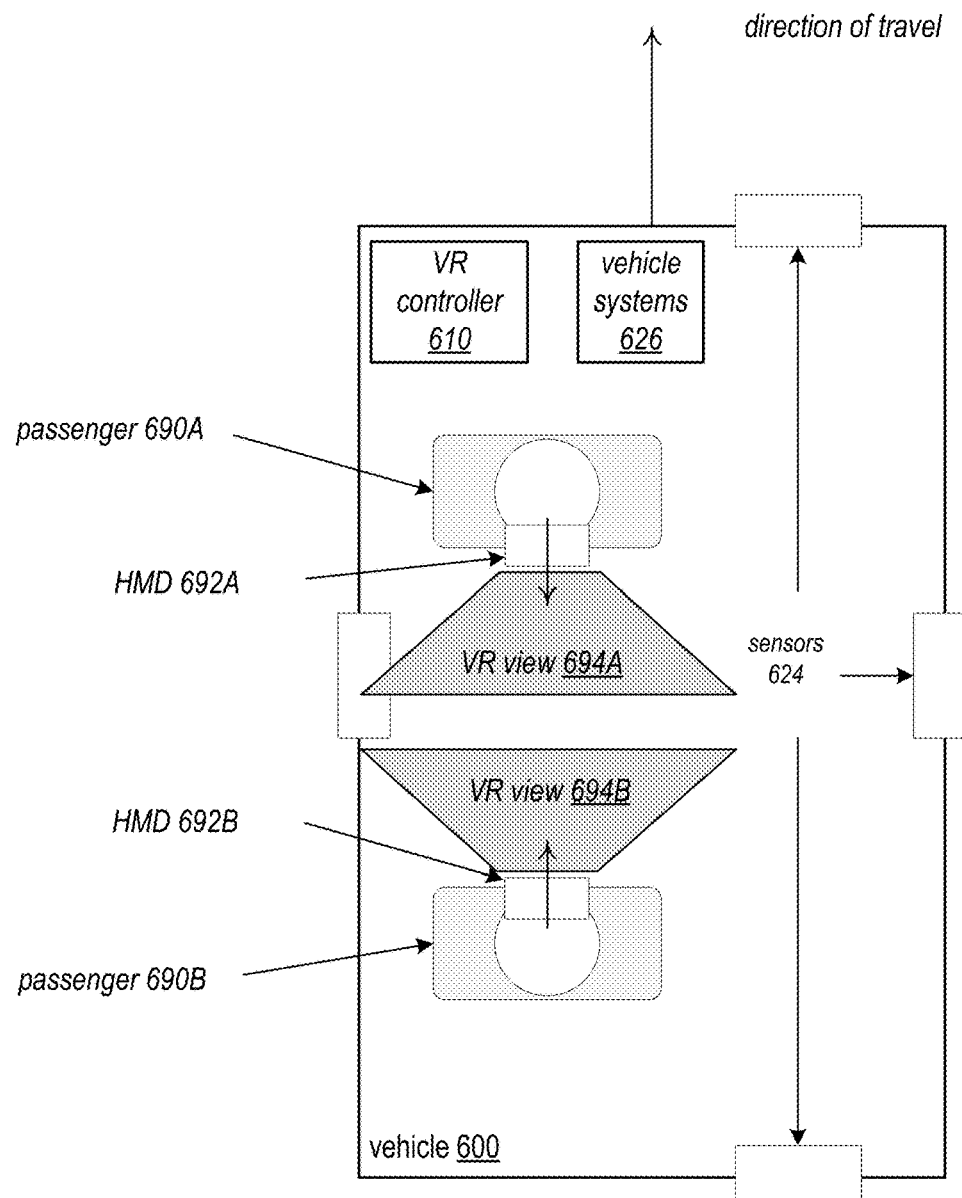
FIG. 6 illustrates a VR system in a vehicle, according to some embodiments.

FIG. 6 illustrates a VR system in a vehicle, according to some embodiments. FIG. 6 shows a VR system as shown in FIG. 1 that includes HMDs 692; however, note that a similar configuration may implement a VR system as shown in FIG. 2. As shown in FIG. 6, a vehicle 600 (which may be, but is not necessarily, an autonomous vehicle) may include a VR controller 610, vehicle systems 626 (e.g., vehicle control systems such as throttle, braking, steering, and active suspension systems, as well as navigation, HVAC and AV systems), internal and external sensors (e.g., LiDAR for depth mapping, video cameras for internal or external views, IMUs, localization systems, etc.). The vehicle 600 may include one or more seats for passengers 690. In this example, a forward-facing and rear-facing seat are used for illustrative purposes. Passenger 690A may be sitting in a rear-facing seat, while passenger 690B may be sitting in a forward-facing seat. Passengers 690A and 690B are wearing respective HMDs 692A and 692B.

In some embodiments, VR controller 610 may obtain inputs from one or more sensors 624 and from one or more vehicle systems 626, may also obtain inputs from one or more external sources (e.g. cloud-based storage or network-based applications), and may also obtain inputs from user devices held by the passengers 690. VR controller 610 may generate respective VR views 694A and 694B for passengers 690A and 690B at least in part according to the various inputs, and provide the VR views 694A and 694B to respective HMDs 692A and 692B for display to passengers 690A and 690B. The VR views 694A and 694B may be of the same virtual or real environment, or may be of different virtual environments, according to preferences of the passengers 690A and 690B. For example, passenger 694A may want to see a real-world view out the front of the vehicle 600, and thus VR controller 610 may generate a view from forward-facing video cameras (which may, but does not necessarily, include composited virtual content), and provide the VR view 694A to HMD 692A for display to passenger 690A. In some embodiments, audio may be provided through headphones of the HMDs 692A and 692B; alternatively, audio may be provided through the vehicle 600's audio system. In some embodiments, VR controller 610 may also generate signals to the vehicle 600's control systems (e.g., to control braking, acceleration, steering, and/or suspension motion within constraints) and vehicle active systems (e.g., audio and HVAC systems, and active seats) to provide physical effects synchronized with the projected views 694 to further enhance the passengers experiences.

As an example use case, the VR system may be used to make it appear to rear-facing passenger 690A that they are riding forwards. Some people tend to get motion sickness while riding backwards. Using the VR system, a real-world view out the front of the vehicle or a virtual view in which it appears that they are riding forwards may be displayed to the passenger 690A. To the passenger 690, since it appears that they are riding forwards while actually riding backwards, acceleration may be sensed as braking, braking may be sensed as acceleration, right turns may be sensed as left turns, and left turns may be sensed as right turns.

Figure 7:
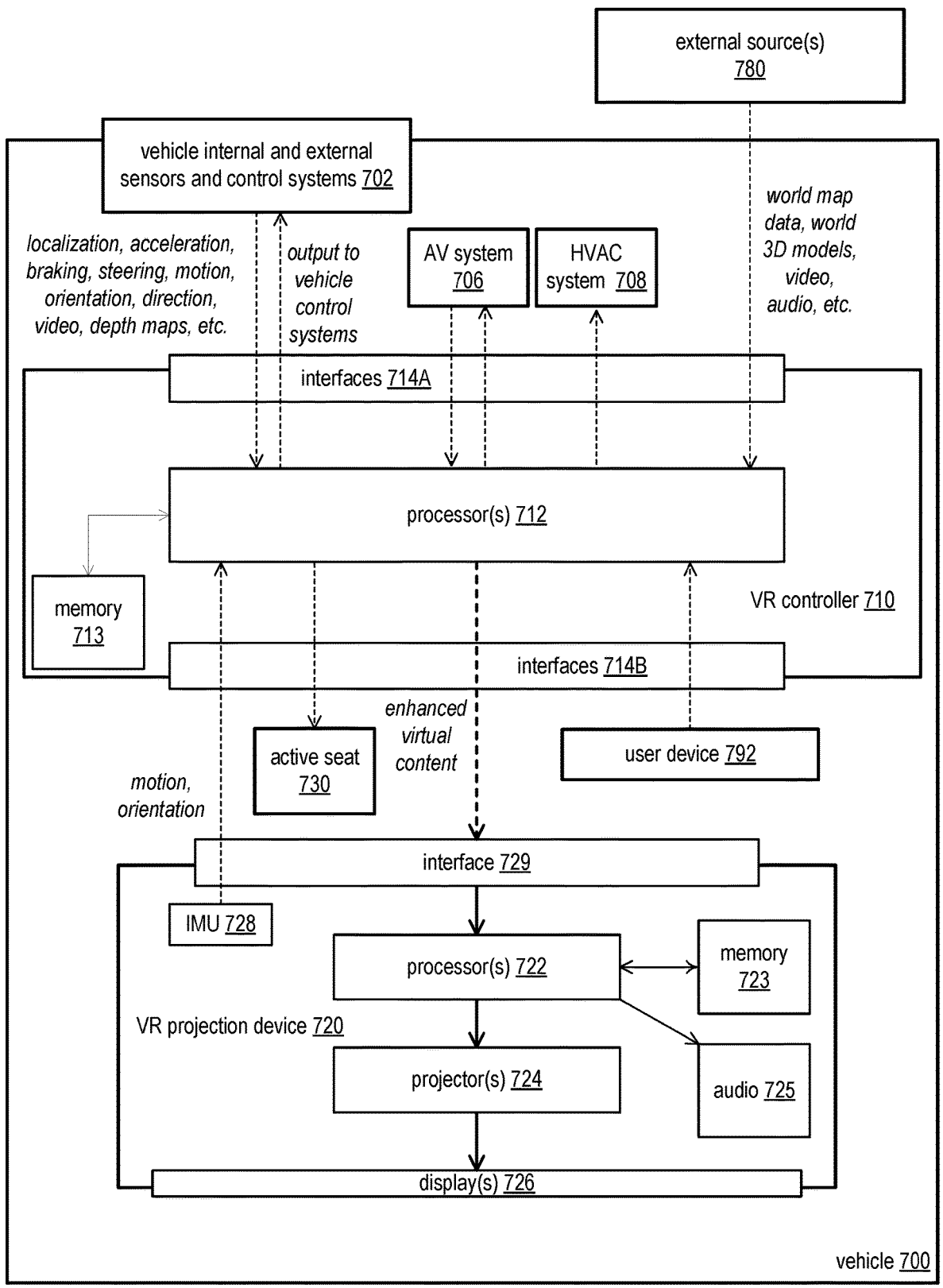
FIG. 7 is a block diagram illustrating components of a VR system in a vehicle, according to some embodiments.

FIG. 7 is a block diagram illustrating components of a VR system in a vehicle, according to some embodiments. As shown in FIG. 7, a vehicle 700 (which may be, but is not necessarily, an autonomous vehicle) may include a VR controller 710. VR controller 710 may include one or more processors 712. Processor(s) 712 may include one or more of various types of processors, CPUs, image signal processors (ISPs), graphics processing units (GPUs), coder/decoders (codecs), memory, and/or other components for processing inputs from various sources to generate VR content and other output signals. VR controller 710 may also include memory 713 that may, for example, store program instructions executable by processor(s) 712 to perform the functionalities of the VR controller 710 to process inputs from various sources and generate VR content and other output signals, as well as data that may be used by the program instructions. VR controller 710 may also include interfaces 714 to various vehicle systems, external sources 780, VR projection device(s) 720, and passenger's user device(s) 792. The interfaces 714 may include wired and/or wireless connections to the various components.

One or more VR projection or display devices 720 (referred to herein as VR devices) may be coupled to the VR controller 710 by wired or wireless communications connections. A VR projection device 720 may be a HMD as shown in FIG. 1, or alternatively may be a projector system as shown in FIG. 2. In some embodiments, VR projection device 720 may include one or more processors 722, a projector 724, a display 726, and one or more wired and/or wireless interfaces 729 for connecting to, receiving input from, and providing output to VR controller 710. Processors 722 may include one or more of various types of processors, CPUs, image signal processors (ISPs), graphics processing units (GPUs), coder/decoders (codecs), memory, and/or other components. Note that a HMD may include two projectors 724, one for each eye, that display or project virtual content to two displays 726, e.g. two screens in a near-eye VR system or reflective lenses in a direct retinal projector system. In some embodiments, a VR projection device 720 may also include memory 723 that may, for example, store program instructions executable by processor(s) 722 to perform the functionalities of the VR projection device 720 to connect to, communicate with, and process inputs from VR controller 710, as well as data that may be used by the program instructions. In some embodiments, a VR projection device 720 may also include an IMU 728 for detecting motion and orientation of the VR projection device 720 (e.g., HMD). In some embodiments, a VR projection device 720 may include or couple to personal audio output devices 725 such as headphones or earbuds. If the VR projection device 720 is a HMD, audio output 725 may be integrated in the HMD.

While not shown, in some embodiments a VR projection device 720 and/or VR controller 710 may include one or more microphones for receiving voice input from passengers; for example, a HMD may include a microphone for receiving voice input from a passenger wearing the device. The voice input may, for example, be used for voice control of the VR system, or for communicating with other passengers wearing HMDs, or for external communications such as phone calls and teleconferencing through the VR controller 710 or vehicle 700 systems. In addition, in some embodiments a VR projection device 720 and/or VR controller 710 may include or couple to internal cameras or other sensors for detecting motions or gestures of the passengers, for example hand, arm, or head gestures, eye movement, facial expressions, etc. In some embodiments, detected gestures, motions, or expressions may be used as input to the VR system to affect rendering and/or display of virtual content to respective passengers. In some embodiments, detected gestures, motions, or expressions may be used as input to the VR system to render animated avatars of respective passengers in the virtual content. In addition, in some embodiments a VR projection device 720 may include one or more external cameras, depth cameras, or other sensors that may be used as input to the VR system to affect rendering and/or display of virtual content to respective passengers.

Figure 18:
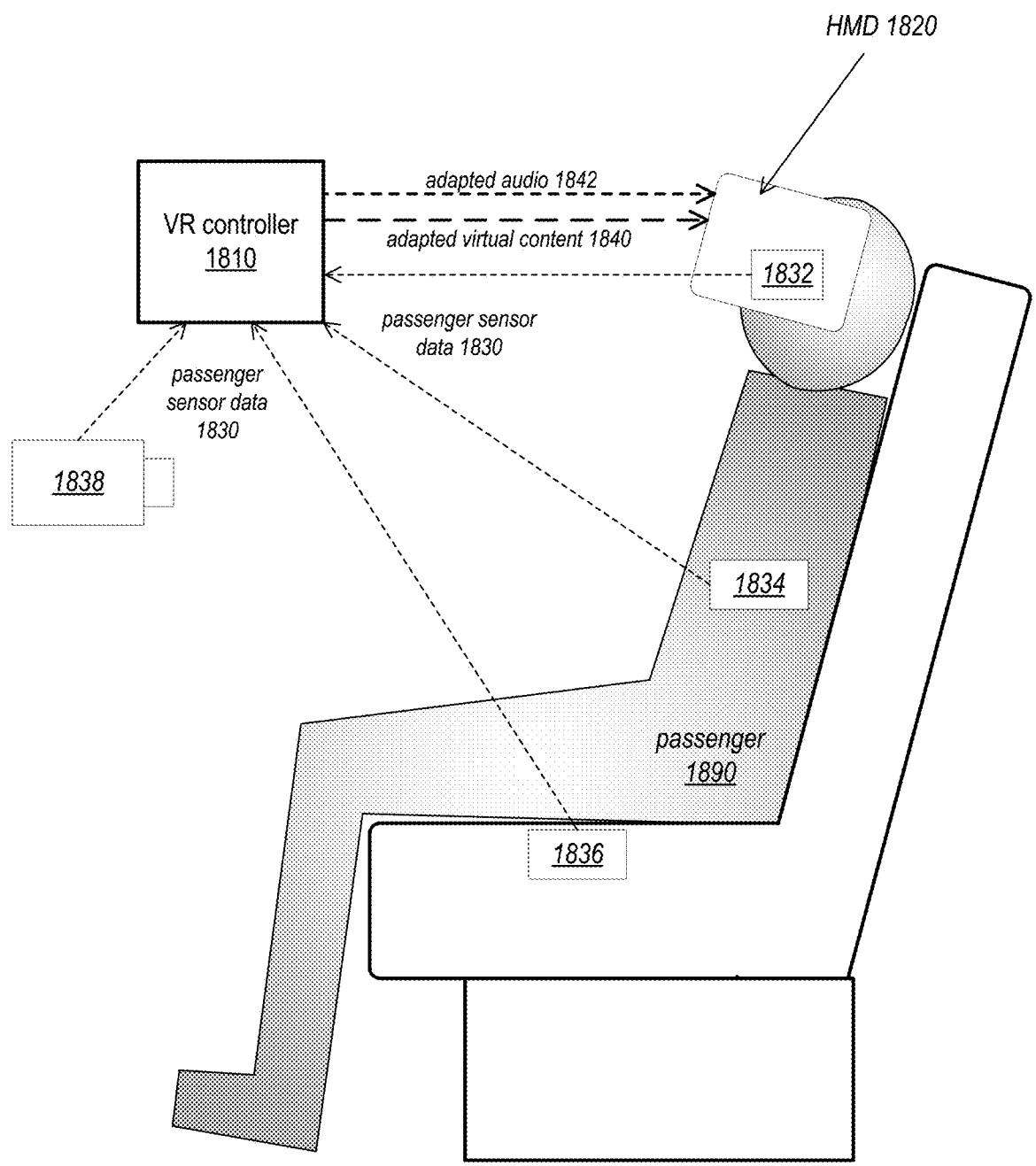
FIG. 18 illustrates a VR system monitoring a passenger using a VR system in a vehicle, according to some embodiments.
Figure 19:
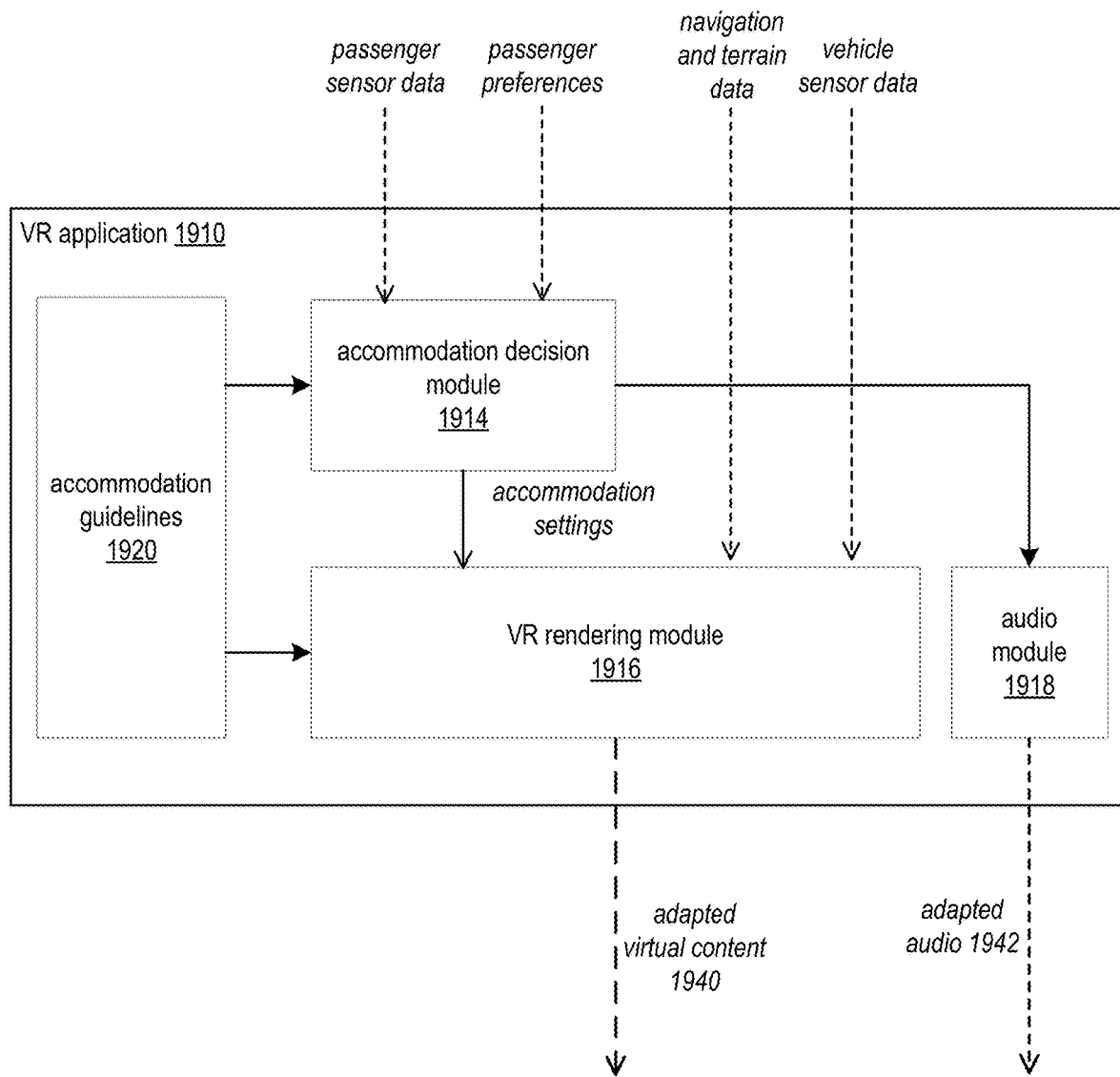
FIG. 19 illustrates a VR application that adapts a VR experience to accommodate a passenger based on passenger preferences and passenger sensor data, according to some embodiments.
Figure 20:
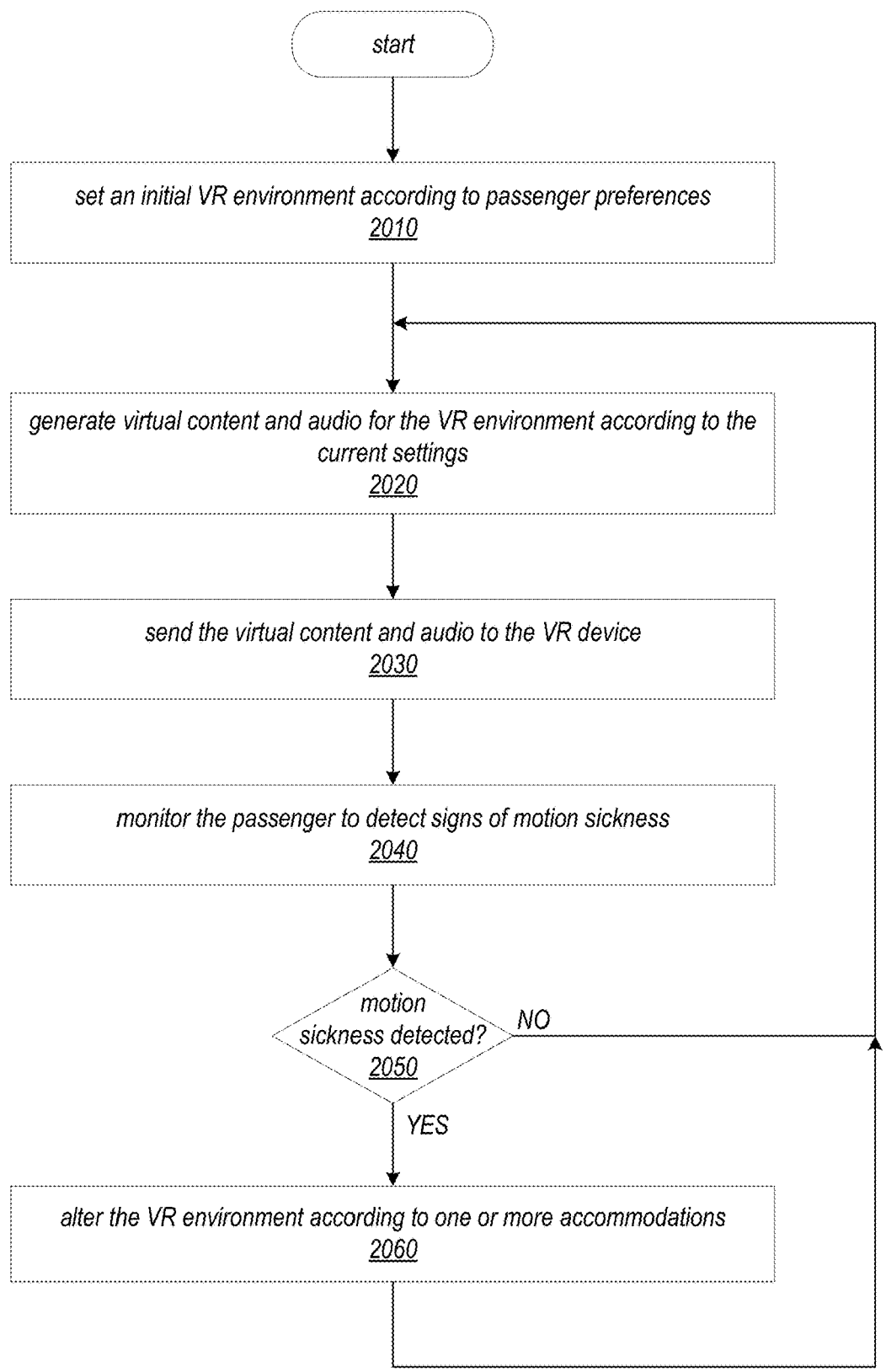
FIG. 20 is a flowchart of a method for adapting a VR experience to accommodate a passenger based on passenger preferences and passenger sensor data, according to some embodiments.

In some embodiments, sensors and cameras in a VR projection device 720 or elsewhere in the vehicle 700 or on a passenger may be used to monitor the passenger for signs of motion sickness (e.g., paleness, sweating, fidgeting, swallowing, burping, pulse rate, breath rate, eye motions, etc.). If early signs of motion sickness are detected, the VR system may be conservative and return to or maintain a 1:1 mapping to real life motions and accelerations in the simulated view displayed to the passenger, and/or may otherwise alter the virtual experience presented to the passenger. If the passenger exhibits no signs of motion sickness, the VR system may vary from the 1:1 mapping, which allows more flexibility in the virtual experience. For example, visual and other cues that provide the sense of acceleration may be increased in the virtual experience to make it feel to the passenger that they are accelerating at a rate faster than the vehicle is actually accelerating, and/or visual and other cues that provide the sense of a turn may be increased in the virtual experience to make it feel to the passenger that they are turning at a rate faster than the vehicle is actually turning. FIGS. 18 through 20 further illustrate monitoring passengers when using the VR system in a moving vehicle and adapting the VR experience according to the passengers' physiological responses.

As shown in FIG. 7, VR controller 710 may receive various inputs (e.g., localization, acceleration, braking, steering, motion, orientation direction, video, depth maps, etc.) from vehicle internal and external sensors and control systems 702. Vehicle internal and external sensors may include, but are not limited to, depth cameras (e.g., LiDAR), video cameras, inertial-measurement units (IMUs). Vehicle control systems may include, but are not limited to throttle control, braking, steering, navigation, and active suspension systems. VR controller 710 may also obtain inputs (e.g., video and/or audio) from one or more vehicle AV systems 706. VR controller 710 may also obtain inputs (e.g., world map data, 3D models of the local environment, information about objects or features in the local environment, video streams, audio (e.g., radio or satellite broadcasts), etc.) from one or more external sources 780 (e.g. cloud-based storage or network-based applications). VR controller 710 may also obtain inputs from one or more user devices 792 such as laptops or tablet/pad devices (e.g., video, audio, user input to keypads or other input devices, etc.). VR controller 710 may also obtain inputs from one or more VR projection devices 720 (e.g., motion and/or orientation information from an IMU 728 of a HMD).

In some embodiments, VR controller 710 may also obtain data collected during previous drives on a route by the vehicle, and use that data during a current drive on the route. For example, data for a frequently traveled route may be stored to cloud storage, and accessed by the VR controller 710 when the vehicle is traveling on the route. Thus, on a route that a passenger frequently travels, data from previous drives on the route may be used during a current drive on the route. In some embodiments, VR controller 710 may also obtain data collected for a route by other vehicles that have traversed the route and that also implement a VR system, and use that data when the vehicle is traversing the route. For example, data for a route traveled by different vehicles may be stored to cloud storage, and accessed by the VR controller 710 when the vehicle is traveling on the route.

Figure 10:
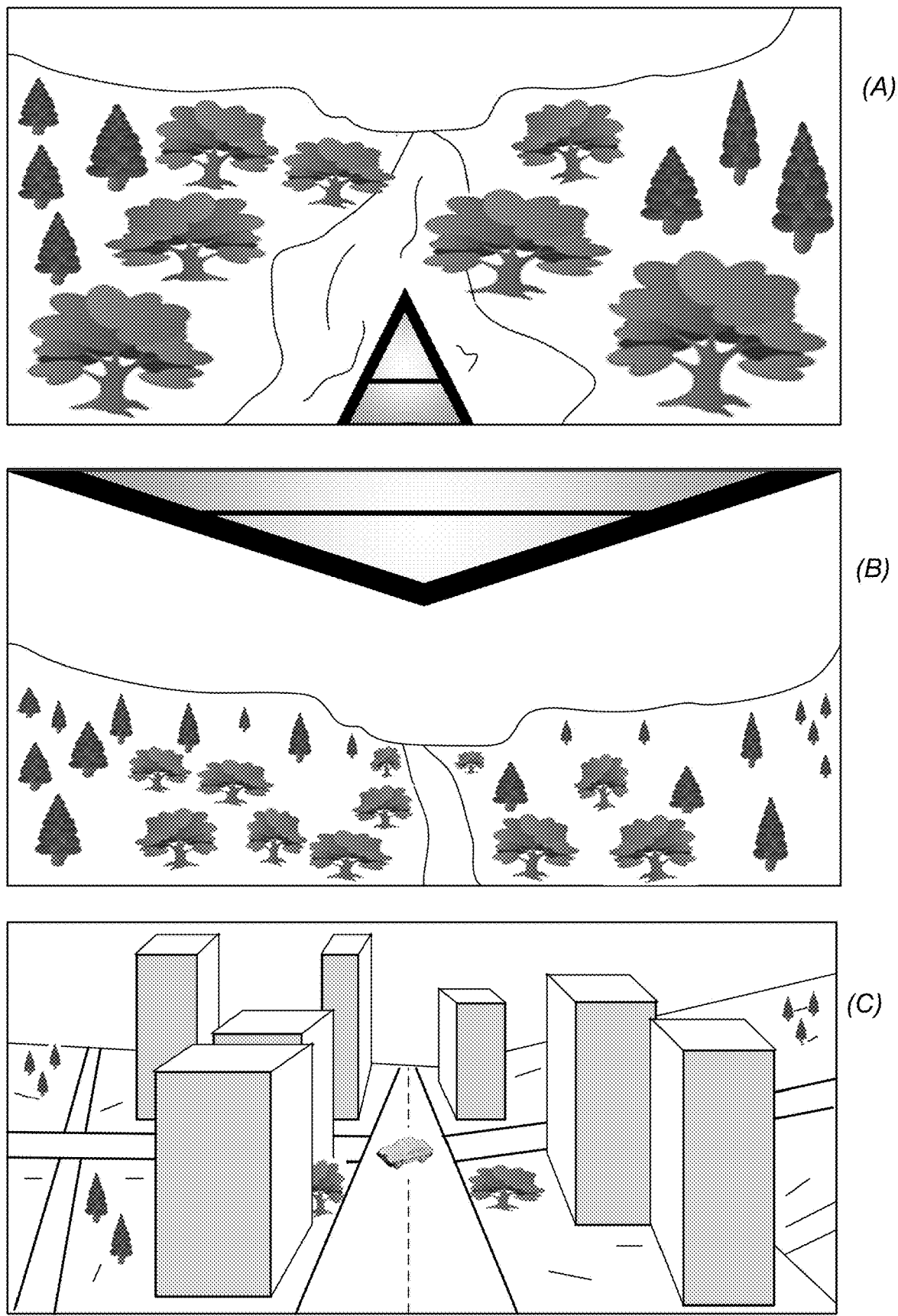

VR controller 710 may generate enhanced virtual content for one or more VR projection devices 720 at least in part according to the various inputs and provide the VR content as output to the device(s) 720 for display. In some embodiments, VR controller 710 may also generate and/or receive audio for the virtual content and provide the audio to the one or more VR projection devices 720 to be played while displaying the virtual content. The virtual content may, for example, provide a passenger with a virtual view of the passenger's personal device (e.g., computer display windows) in a view of the real environment as illustrated in FIGS. 3 and 4, so that the content appears to the passenger to be fixed in space at some distance in front of the vehicle, which may for example help to prevent motion sickness, and may thus allow the passenger to be productive while riding in the vehicle. Alternatively, the virtual content may provide an immersive VR environment and experiences to passengers, for example as illustrated in FIGS. 9 through 11.

In some embodiments, VR controller 720 may generate output signals to one or more vehicle control systems 702 (e.g., to control braking, acceleration, steering, or suspension/motion within constraints) and vehicle active systems (e.g., AV 706 and HVAC 708 systems and active seat 730) to provide physical effects synchronized with the virtual content to further enhance a passenger's virtual environments and experiences.

While embodiments are generally described in which the VR controller 710 renders virtual content and provides frames including the virtual content to one or more VR projection devices 720 for display or projection to respective passengers, in some embodiments at least part of the rendering of virtual content may be performed by the VR projection device(s) 720. Further, in some embodiments, a VR controller 710 may be a component of a VR projection device 720, for example a VR controller 710 may be built in to a HMD, and may communicate with vehicle systems and sensors via wired and/or wireless communications connections.

Figure 8:
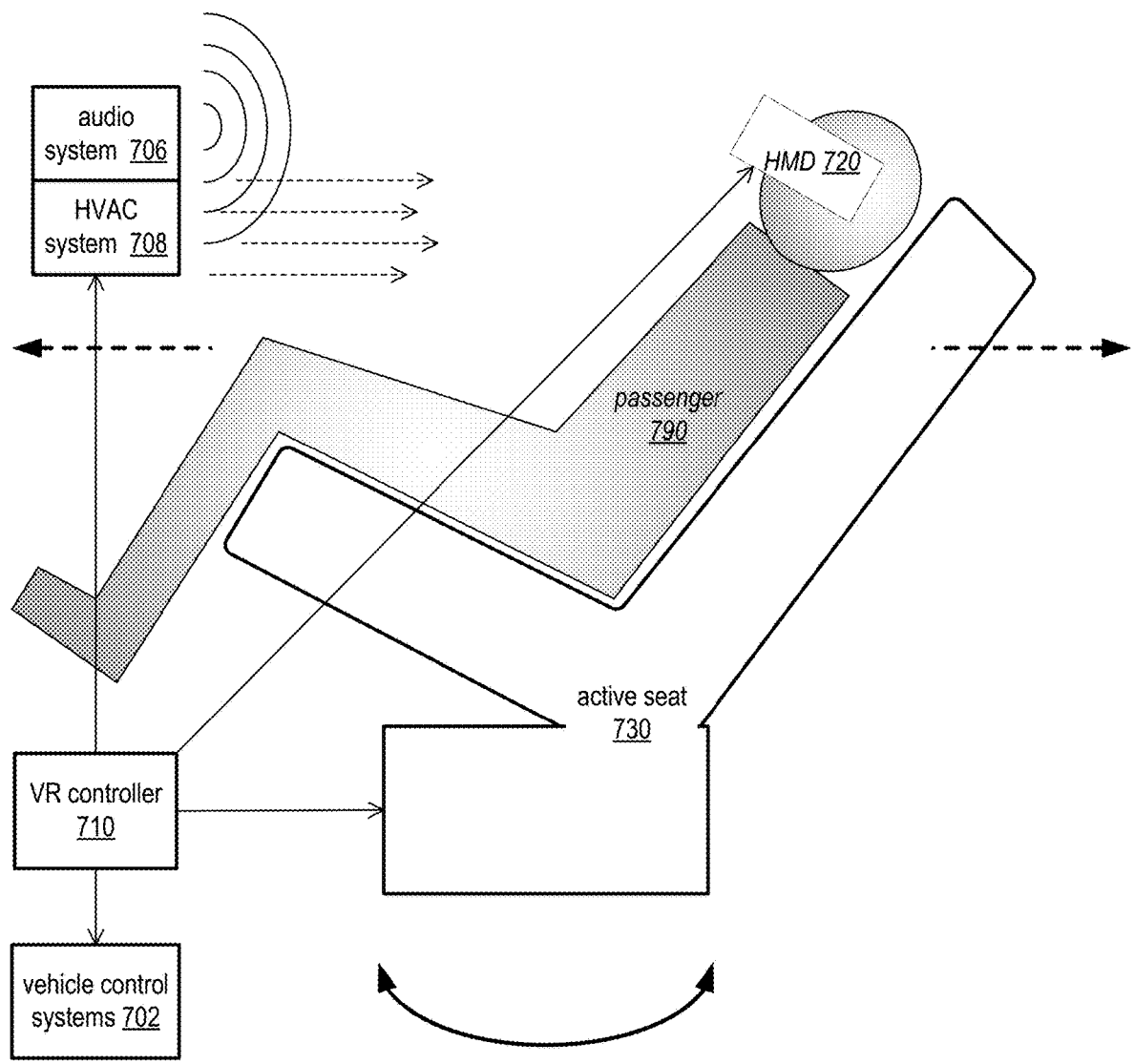
FIG. 8 is a block diagram illustrating active systems in a vehicle that may be used in a VR system to provide synchronized physical effects for passengers, according to some embodiments.

FIG. 8 is a block diagram illustrating active systems in a vehicle that may be used in a VR system to provide synchronized physical effects for passengers, according to some embodiments. FIG. 8 shows an example in which a passenger 790 wearing a HMD 720 is seated in an active seat 730 of a stationary or moving vehicle that includes a VR controller 710; the passenger 790 may be facing forward or backward in the vehicle. As illustrated in FIG. 8, in some embodiments, VR controller 720 may generate signals to one or more vehicle control systems 702 (e.g., to control braking, acceleration, steering, or suspension/motion within constraints) and vehicle active systems (e.g., AV 706 and HVAC 708 systems and active seat 730) to provide physical effects synchronized with the virtual content to further enhance a passenger's virtual environments and experiences. For example, an active seat 730 may be tilted to change the acceleration forces a forward- or rear-facing passenger 790 feels, for example to reduce or increase the sense of acceleration that the passenger 790 feels. For example, tilting the active seat 730 backwards may cause a forward-facing passenger 790 to feel a gravity vector pushing on their back, causing or increasing the sense of forward acceleration. As another example, in some embodiments, one or more vehicle control systems 702 (e.g., throttle, braking, and/or active suspension control systems) may be controlled by VR controller 710 within constraints, possibly along with the active seat 730, to cause the passenger 790 to sense that they are sitting still in a room rather than moving in a vehicle. In some embodiments, VR controller 710 may anticipate bumps in the road (e.g., from surface condition information for the route the vehicle is traveling that was previously recorded when traveling the route, or from surface information obtained from an external source), and move active seat 730 up or down, and/or control one or more of the vehicle's control systems within constraints (e.g., the throttle, brakes, and/or active suspension), to soften or eliminate jolts to the passenger 790 that may be caused when the vehicle goes over the bumps. As another example, VR controller 710 may direct an HVAC system 708 to increase its fan speed so that a passenger 790 in an immersive VR environment such as a hang glider experience as illustrated in FIG. 10 (B) will feel the wind rushing past them, or to increase the heat so that a passenger 790 sitting in front of a virtual fireplace or campfire will feel heat coming from the fire. As another example, VR controller 710 may play audio accompanying a VR experience through an audio system 706 of the vehicle, or alternatively through an audio system integrated in HMD 720.

As an example use case, the VR system may be used to make it appear to a rear-facing passenger 790 that they are riding forwards. Some people tend to get motion sickness while riding backwards. Using the VR system, a real-world view out the front of the vehicle or a virtual view in which it appears that they are riding forwards may be displayed to the passenger 790. To the passenger 790, since it appears that they are riding forwards while actually riding backwards, acceleration may be sensed as braking, braking may be sensed as acceleration, right turns may be sensed as left turns, and left turns may be sensed as right turns. In some embodiments, the active seat 730, the HVAC system 708, the audio system 706, and one or more vehicle control systems 702 (e.g., throttle, braking, and/or active suspension control systems) may be controlled by VR controller 710, within constraints, to cause the passenger 790 to sense that they are riding forwards when they are actually riding backwards.

FIGS. 9 through 11 graphically illustrate several example immersive VR experiences that may be provided by embodiments of a VR system, and are not intended to be limiting. Embodiments of the VR system may provide immersive VR experiences to passengers in vehicles, for example by replacing the view of the real world with any of various types of virtual experiences and environments that a passenger may desire. Vehicle motions may be integrated into the virtual experiences, for example to help prevent motion sickness and to enhance the virtual experience. Integrating the VR system with a vehicle in motion provides opportunities for enhancing virtual experiences that are not available while sitting in a room using a stationary simulator or wearing a HMD. For example, accelerations and motions in a virtual experience can be matched to or enhanced by accelerations and motions of the vehicle. In some embodiments, active vehicle systems (e.g., HVAC systems, audio systems, and active seats) and/or vehicle control systems (e.g., braking, throttle, steering, and active suspension systems) within constraints, may be integrated with the VR system to provide physical effects with the virtual experience, for example rushing wind or heat through the HVAC system, surround sound and sound effects through the audio system, and acceleration or motion effects through the seat.

FIGS. 9 (A) and (B) show examples of immersive VR experiences that may be used to enhance productivity while riding in vehicles, while also providing an interesting VR experience for participants. For example, two or more people may hold a meeting as avatars around a table in a virtual environment, for example in a virtual room as shown in FIG. 9 (B) or on the bed of a flatbed truck as shown in FIG. 9 (A). Alternatively, different ones of the participants may experience different VR environments for a meeting; for example, to one participant, it may appear as if they are meeting on the flatbed of a truck, while to another it may appear that they are meeting in a room at the office. The participants may be in the same vehicle, or in different vehicles, on the way to or from work. Or some of the participants may be in vehicles on the way to or from work, while one or more others are already at the office, or at home, or at other locations. A view of one of the participant's computer screens may be projected into the virtual environment for all of the participants to view. The virtual content presented to each participant may be based on what the particular participant is experiencing. For example, a participant sitting at home or in the office may be presented with a static view of the meeting in an office as illustrated in FIG. 9B, while a participant riding in a vehicle may be presented with a dynamic view of the meeting from the back of a truck as illustrated in FIG. 9A, with scenery flowing past and motion integrated into the experience.

In some embodiments, passengers may choose to have relaxing virtual experiences while riding in a vehicle such as floating down a river in a canoe or on a tube as shown in FIG. 10 (B) or soaring over a landscape in a hang glider as shown in FIG. 10 (B). In some embodiments, the path the passenger takes in the virtual environment may follow the actual path the vehicle is following in the real world; for example, curves or turns on the actual route may be modeled as turns or curves on the river the passenger is floating down. In some embodiments, bumps on the road the vehicle is traveling on, or stops of the vehicle, may be anticipated by the VR system, which may render virtual content in the environment to provide context to the motion the passenger actually feels; for example, the virtual canoe the passenger is riding in may bump over a virtual log in the river when the vehicle goes over a speed bump, or temporarily get stuck on a sandbar or in an eddy when the vehicle stops at a stop sign or light. In some embodiments, the VR system may direct the vehicle's systems to provide physical effects along with the virtual experience, for example by directing the HVAC system to blow on the passenger during a hang gliding experience.

FIG. 10 (c) illustrates that a passenger may choose to have the virtual experience of riding through another real location, such as the streets of London, or through fictional cities or landscapes. The virtual experiences may be educational and interactive, for example allowing the passenger to discover history or other information about landmarks in a virtual view of a city that they are experiencing. The virtual experiences may be interactive in other ways, for example allowing a passenger to pass other vehicles during a virtual road race experience, or run over zombies in a post-apocalyptic landscape. In some embodiments, the VR system may select a route in a real city being simulated that closely matches the actual route the vehicle is taking, for example so that turns, curves, and stops in the virtualized view of the city closely match the turns, curves, and stops in the actual route the vehicle is taking. Note that the match between the route in the real city being simulated and the actual route the vehicle is taking it does not have to be a 1:1 match. For example, a simulated city block could be stretched out by adding one or two simulated storefronts or houses so that the simulated city block matches the length of a street on the actual route. In some embodiments, bumps on the road the vehicle is traveling on, or stops of the vehicle, may be anticipated by the VR system, which may render virtual content in the environment to provide context to the motion the passenger actually feels; for example, the virtual vehicle the passenger is riding in may run over a zombie in an apocalyptic landscape when the vehicle goes over a speed bump. In some embodiments, the VR system may direct the vehicle's systems to provide physical effects along with the virtual experience, for example by directing the HVAC system to blow on the passenger if the virtual view shows wind blowing in the virtual landscape.

As shown in FIG. 11, in some embodiments, virtual views of real or fictional people may be integrated into the virtual experience provided by the VR system. For example, as shown in FIG. 11 (B), a virtual representation 1195 of an author or talk show host may appear to be sitting in the seat next to the passenger 1190; the virtual author may be reading one of their books to the passenger, or the virtual talk show host may be hosting their show from the seat next to the passenger, with their voices provided through the audio system of the vehicle or the HMD 1100. As another example, as shown in FIG. 11 (A), the passenger may experience riding on a flatbed truck with a virtual band playing a gig on the flatbed, with the band's music provide through the audio system of the vehicle or the HMD 1100.

Figure 12:
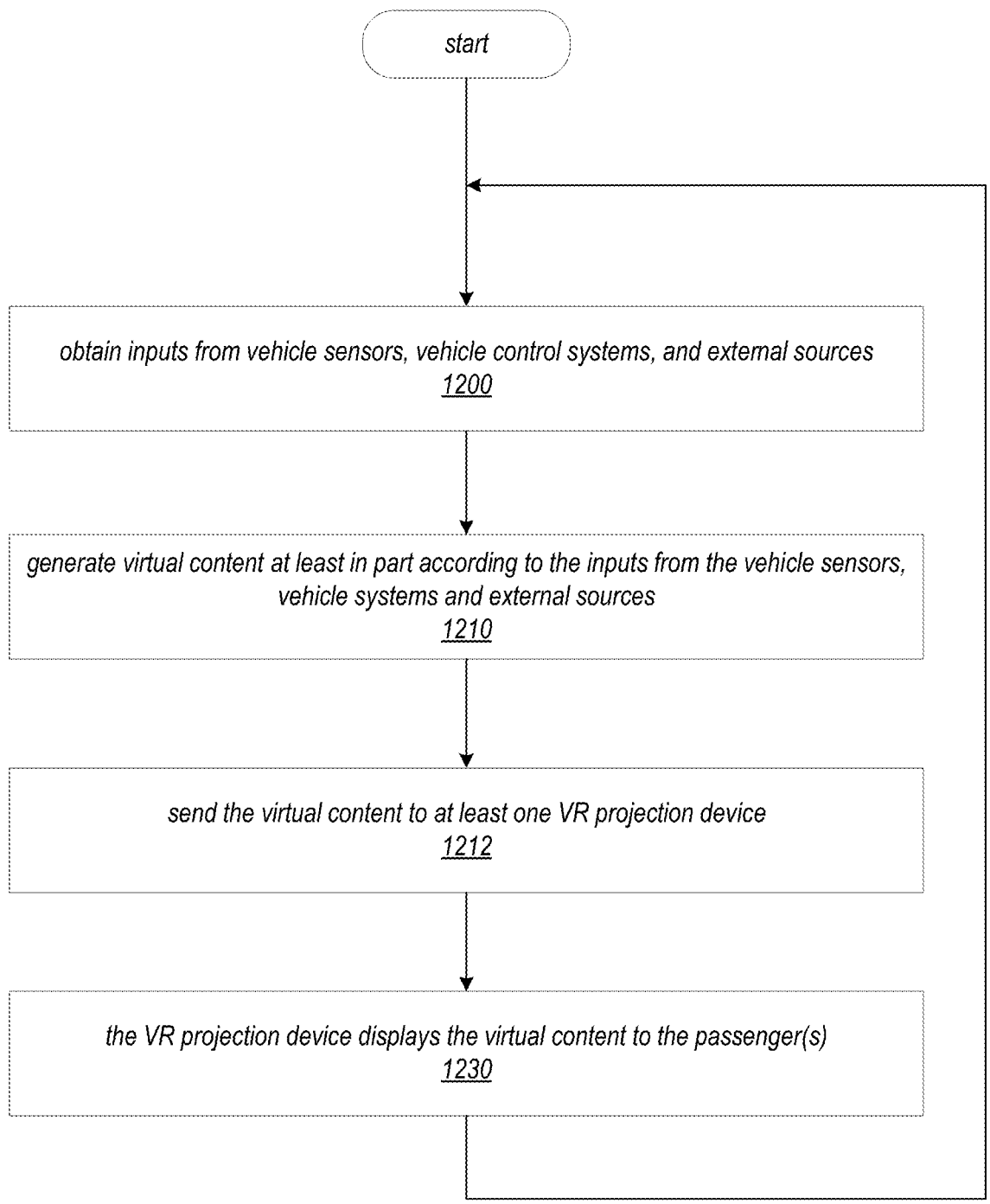
FIG. 12 is a high-level flowchart of a method for providing VR experiences to passengers in vehicles, according to some embodiments.

FIG. 12 is a high-level flowchart of a method for providing VR experiences to passengers in vehicles, according to some embodiments. The method of FIG. 12 may, for example be implemented by a VR system as illustrated in FIG. 1, FIG. 2, FIG. 6, or FIG. 7.

As indicated at 1200, a VR system in a vehicle may obtain inputs from vehicle sensors, (e.g., depth map information, video, etc.), vehicle systems (e.g., steering, braking, throttle, active suspension, localization, and IMU systems), and external sources (e.g., world map data, 3D models, etc.). As indicated at 1210, the VR system may generate virtual content at least in part according to the inputs from the vehicle sensors, vehicle systems and external sources. As indicated at 1220, the VR system may send the virtual content to at least one VR projection device, for example a HMD as illustrated in FIG. 1 or a projector as illustrated in FIG. 2. As indicated at 1230, the VR projection device displays the virtual content to the passenger(s). While not shown, in some embodiments, the VR system may also generate signals to the vehicle control systems (e.g., to control braking, acceleration, steering, or suspension/motion within constraints) and vehicle active systems (e.g., audio and HVAC systems, and active seats) to provide physical effects synchronized with the projected virtual content to further enhance the passenger's experience. As indicated by the arrow returning from 1230 to 1200, the method of FIG. 12 may be a continuous process for the duration of the VR experience.

In some embodiments a VR projection device (e.g., a HMD) may include cameras, depth cameras, and/or other sensors, and the VR system may instead or also obtain inputs from the VR projection device, and may generate virtual content at least in part according to the inputs from the sensors on the VR projection device.

Figure 13:
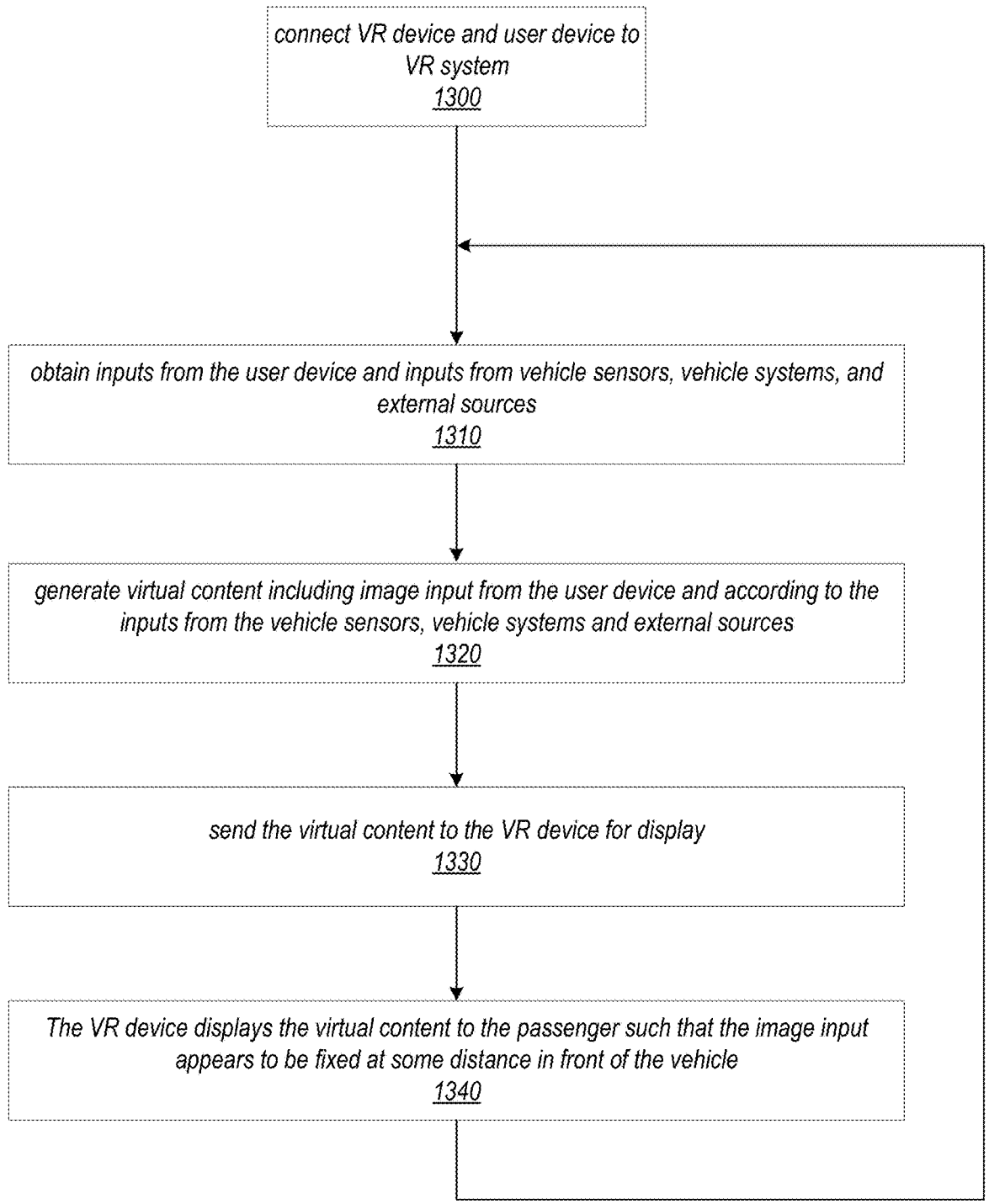
FIG. 13 is a flowchart of a method for providing virtual content in a mixed reality view of the environment to passengers in vehicles, according to some embodiments.

FIG. 13 is a flowchart of a method for providing virtual content in a mixed reality view of the environment to passengers in vehicles, according to some embodiments. The method of FIG. 13 may, for example be implemented by a VR system as illustrated in FIG. 1, FIG. 2, FIG. 6, or FIG. 7.

As indicated at 1300, a VR device (e.g., a HMD as shown in FIG. 1) and a user device (e.g., a laptop or notebook computer, tablet or pad device, etc.) may be connected to a VR system in a vehicle, for example using wired or wireless connections. As indicated at 1310, the VR system may obtain image input (e.g., a view of the display or of one or more windows on the display of the device) from the user device, and may also obtain inputs from vehicle sensors (e.g., depth information, video, etc.), vehicle systems (e.g., steering, braking, throttle, active suspension, localization, and IMU systems), and external sources (e.g., world map data, 3D models, etc.). As indicated at 1320, the VR system may generate virtual content including the image input from the user device and according to the inputs from the vehicle sensors, vehicle systems and external sources. As indicated at 1330, the VR system may send the virtual content to a VR device (e.g., a HMD) for display to a passenger. As indicated at 1340, the VR device displays the virtual content to the passenger such that the image input appears to be fixed at some distance in front of the vehicle, for example as shown in FIG. 3, 4, or 5. As indicated by the arrow returning from 1340 to 1310, the method of FIG. 13 may be a continuous process for the duration of the VR experience.

In some embodiments a VR projection device (e.g., a HMD) may include cameras, depth cameras, and/or other sensors, and the VR system may instead or also obtain inputs from the VR projection device, and may generate virtual content at least in part according to the inputs from the sensors on the VR projection device.

Figure 14:
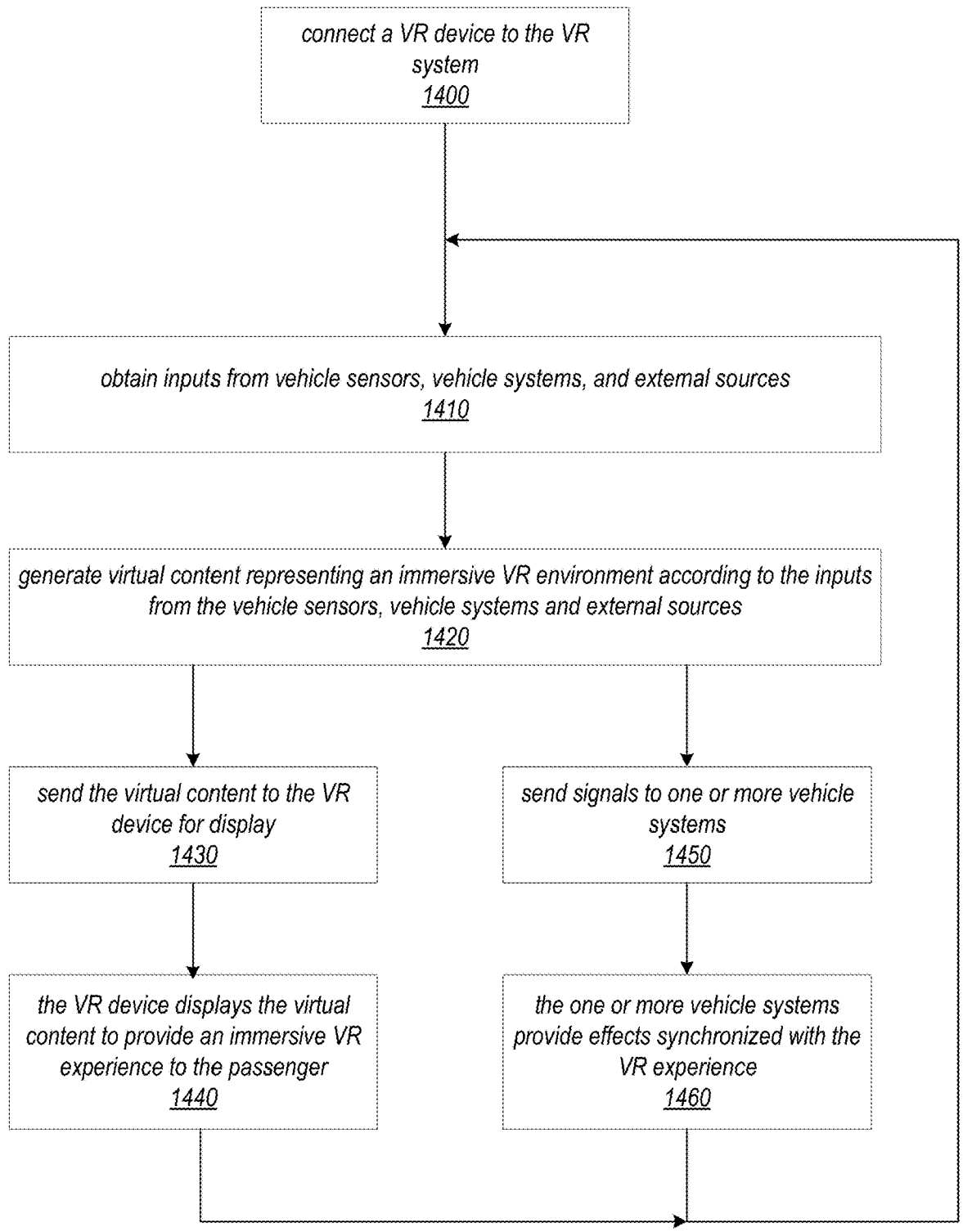
FIG. 14 is a flowchart of a method for providing immersive VR experiences with environmental effects to passengers in vehicles, according to some embodiments.

FIG. 14 is a flowchart of a method for providing immersive VR experiences with environmental effects to passengers in vehicles, according to some embodiments. The method of FIG. 14 may, for example be implemented by a VR system as illustrated in FIG. 1, FIG. 2, FIG. 6, or FIG. 7.

As indicated at 1400, a VR device (e.g., a HMD as shown in FIG. 1) may be connected to a VR system in a vehicle, for example using a wired or wireless connection. As indicated at 1410, the VR system may obtain inputs from vehicle sensors, (e.g., depth map information, video, etc.), vehicle systems (e.g., steering, braking, throttle, active suspension, localization, and IMU systems), and external sources (e.g., world map data, 3D models, etc.). As indicated at 1420, the VR system may generate virtual content representing an immersive VR environment according to the inputs from the vehicle sensors, vehicle systems and external sources. As indicated at 1430, the VR system may send the virtual content to a VR device (e.g., a HMD) for display to a passenger. As indicated at 1440, the VR device displays the virtual content to provide an immersive VR experience to the passenger. As indicated at 1450, the VR system may also send signals to one or more vehicle systems. As indicated at 1460, the one or more vehicle systems may provide physical effects for the passenger that are synchronized with and that enhance the VR experience. As indicated by the arrow returning from 1460 to 1400, the method of FIG. 14 may be a continuous process for the duration of the VR experience.

In some embodiments a VR projection device (e.g., a HMD) may include cameras, depth cameras, and/or other sensors, and the VR system may instead or also obtain inputs from the VR projection device, and may generate virtual content at least in part according to the inputs from the sensors on the VR projection device.

In some embodiments, in the methods as described in FIGS. 12 through 14, to reduce or eliminate latency in rendering virtual content for display to the passengers, the VR system may "look ahead", for example using world map data, 3D models of the environment, and vehicle sensor data to render virtual content and to determine physical effects for particular locations on a route the vehicle is taking prior to the vehicle actually reaching the locations. This "look ahead" rendering helps to insure that the visual and physical experiences of passengers in the VR environment closely match the actual physical motions of the vehicle on the route.

Accommodating Passenger Preferences and Tendencies in VR Environments

Some passengers may tend to experience motion sickness more than others when engaged in a VR environment presented by a VR system in a vehicle as described in FIGS. 1 through 14. Some passengers so engaged may rarely or never experience motion sickness. In some embodiments, a VR application executing on the VR system may adapt the VR environment and experience to accommodate different passengers' preferences and tendencies. As an example, in some embodiments, visual cues may be slowed down or sped up when compared to the actual speed or acceleration of the vehicle to accommodate different passengers' preferences and tendencies. Maintaining a 1:1 mapping ratio, or slowing down the visual cues, may help in mitigating motion sickness for a passenger who is prone to or exhibits signs of motion sickness. For a passenger who is not prone to or does not exhibit signs of motion sickness, the visual cues may be sped up, for example to a 1:2 mapping ratio, to provide an enhanced, more exciting virtual experience to the passenger.

In addition to adapting the mapping ratio for passengers to help prevent motion sickness, several other visual and audio techniques (referred to as accommodations) may be used in VR experiences to increase the comfort of and mitigate motion sickness for passengers using the VR system in a vehicle. Guidelines describing these accommodations for passengers using the VR system in a vehicle may be provided to VR application developers. One or more of these accommodations may be integrated into VR applications that execute in the VR system according to the guidelines, and the accommodations may be applied in the VR experiences generated by the VR applications. One or more of the accommodations may be applied by default in a VR experience, or may be added to (or removed from) a VR experience based on a particular passenger's preferences and/or based on feedback from a passenger monitoring system that detects signs of motion sickness or discomfort in particular passengers.

While embodiments are generally described as providing accommodations in VR experiences for passengers using the VR system in a moving vehicle, in some embodiments, VR experiences may be recorded for later playback by the person that had the original experience or by others while not in a moving vehicle, for example while sitting in a room. One or more of the accommodations described herein may be provided during playback of VR experiences so that viewers that are stationary, for example, seated in a room, and whose vestibular organs thus do not experience any accelerations, do not experience symptoms of motion sickness from viewing the moving VR content being played back.

Figure 15:
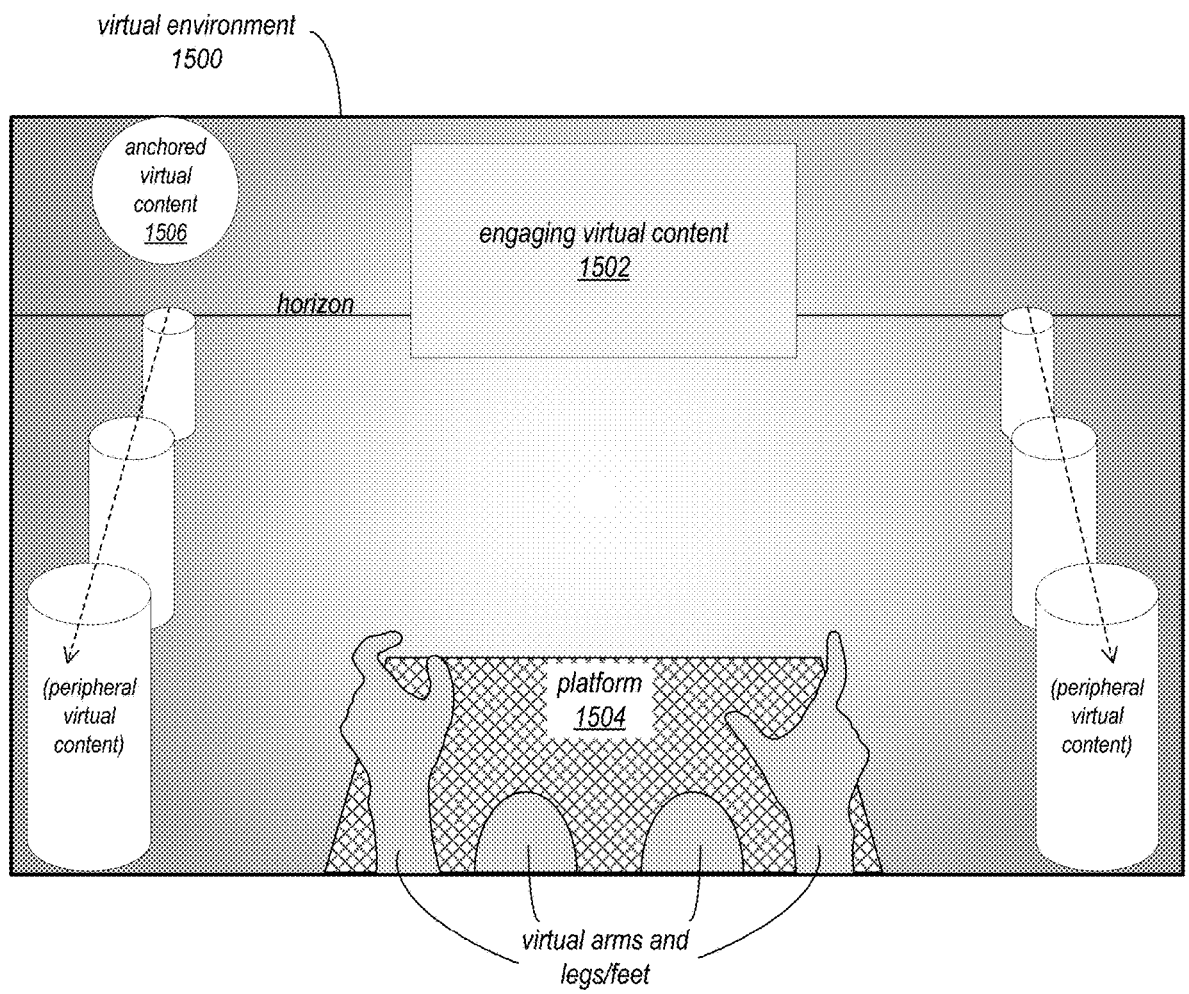
FIGS. 15 through 17 graphically illustrate visual accommodations that may be used in VR experiences, according to some embodiments.
Figure 16:
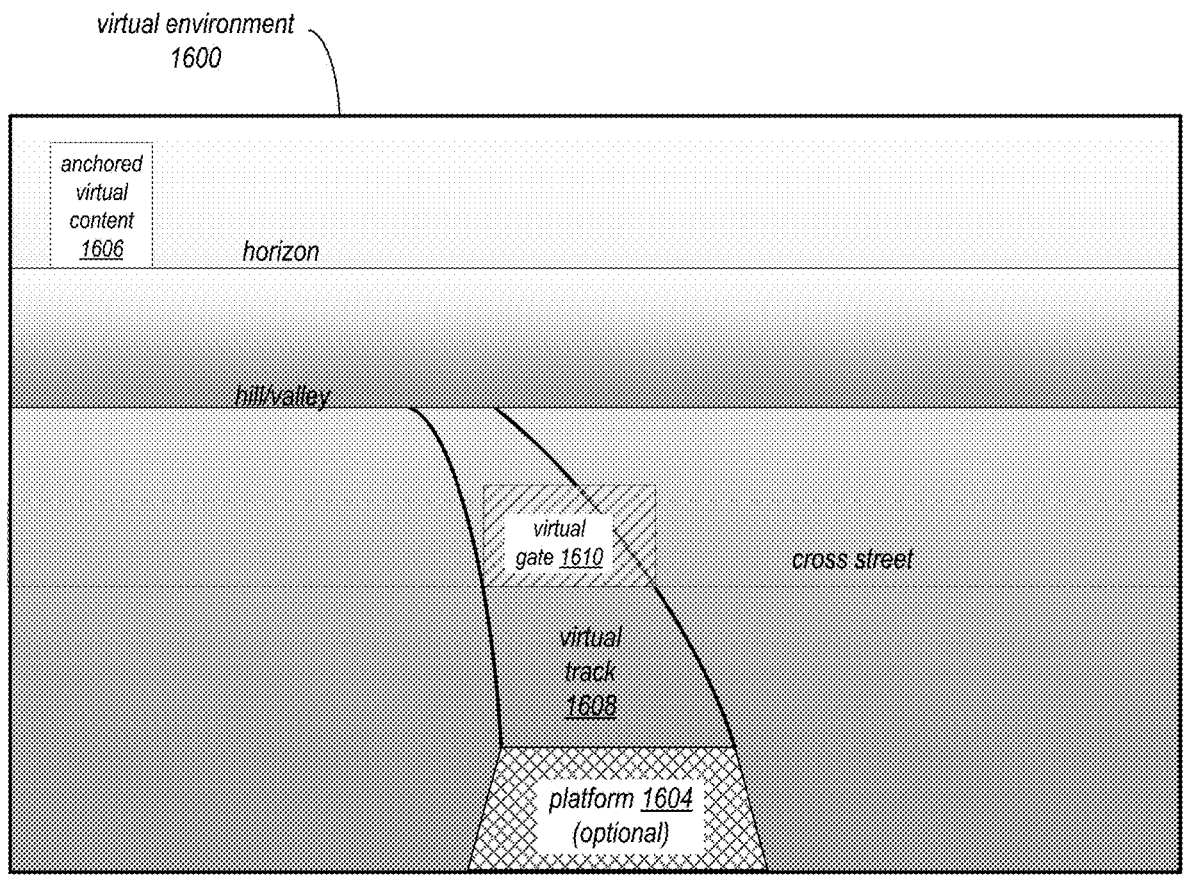
Figure 17:
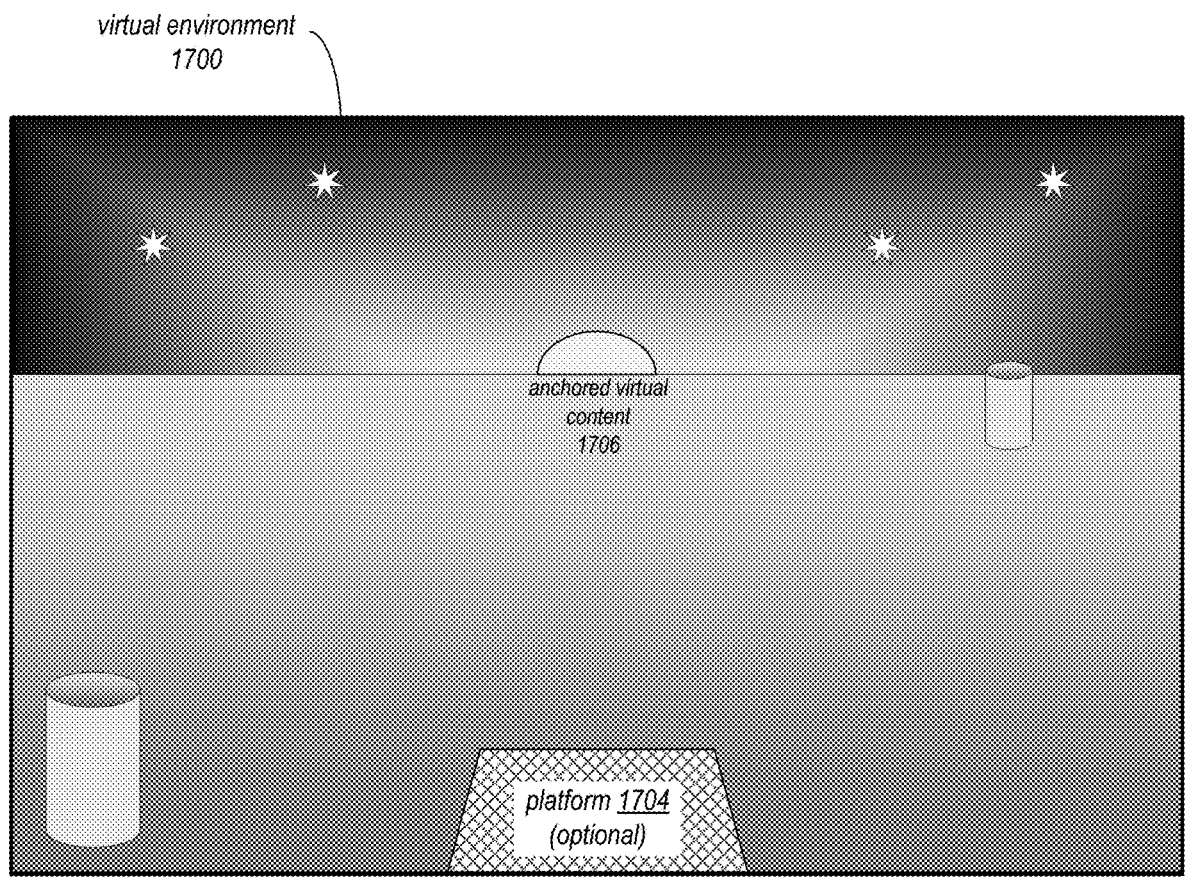

FIGS. 15 through 17 graphically illustrate several visual accommodations that may be used in VR experiences to increase comfort of and mitigate motion sickness for passengers using the VR system in a vehicle, according to some embodiments. The accommodations illustrated in FIGS. 15 through 17 may, for example, be implemented in VR systems as illustrated in FIGS. 1 through 14.

As shown in FIG. 15, in some embodiments, a virtual ground plane or platform 1504 may be provided beneath the passenger in the virtual environment 1500, for example positioned in the virtual environment 1500 where the passenger's feet would be, to help avoid symptoms of motion sickness. This prevents the passenger from having the sense of flying through space without a ground plane beneath them, which is disconcerting to some passengers. In some embodiments, virtual representations of the passenger's arms and legs may also be displayed.

Looking down or to the side in a moving vehicle, especially while engaged in an activity such as reading, can induce symptoms of motion sickness in some passengers. Thus, the VR environment 1500 should encourage passengers to look forward and keep their heads upright when the vehicle is in motion. In some embodiments, as shown in FIG. 15, a VR application may provide engaging visual content 1502 directly ahead of the passengers and at an eye level to encourage the passengers to look forward and keep their heads upright. The VR application should avoid displaying text or other attention-grabbing content that would require the passengers to look downward to view the content while the vehicle is in motion. The VR application should avoid displaying text or other attention-grabbing content to the right or left side of the passenger because optic flow cues provided by peripheral virtual content are faster on the sides when the vehicle is in motion, and thus have the potential to create motion sickness.

As shown in FIG. 15, anchored virtual content 1506 may be provided to help passengers orient themselves in the real world while experiencing a virtual environment 1500 in a moving vehicle. In some embodiments, an object or aspect may be displayed in the virtual environment that is anchored to a real world direction (e.g., the sun or moon anchored at due west or due east, or a tall building anchored at due north) so that the passenger may more easily track where they are and how they are oriented in the real world as the vehicle follows a real-world route. As the vehicle makes a turn in the real world, the virtual world (including engaging virtual content 1502) turns with the vehicle, but the anchored virtual content 1506 remains fixed relative to the real world.

In some embodiments, preview information about upcoming driving maneuvers and real-world terrain effects that can be physically felt (e.g., right turns, left turns, stops (e.g., at red lights or stop signs), climbs in elevation, dips, speed bumps, downhill portions, etc.) may be provided for improved passenger comfort. In VR experiences where there is no video see-through of the real world and in which no cues about maneuvers are provided, passengers may experience discomfort from not being able to tell where they are in the real world, and from not being able to anticipate and brace themselves for upcoming driving maneuvers which physically affects their vestibular/balance sense. The preview information for driving maneuvers and real-world terrain effects may be provided by visual, audio, and/or haptic cues. For example, visual cues (e.g., directional arrows) may be displayed to indicate upcoming left or right turns, climbs, or descents. As another example, audio cues may be played to indicate upcoming maneuvers; for example, a sound or tone may be played to the left ear to indicate an upcoming left turn, and to the right ear to indicate an upcoming right turn, with different tones or sounds played to both ears to indicate upcoming descents or climbs. As another example, haptic cues may be generated to indicate upcoming maneuvers; for example, the left side of the seat may vibrate to indicate an upcoming left turn, and the right side of the seat may vibrate to indicate an upcoming right turn. As another example, visual, audio, and/or haptic cues may be provided to alert the passenger of an upcoming dip or bump in the road. As shown in FIG. 16, in some embodiments a virtual path or track 1608 may be displayed in the virtual environment 1600 that follows the path and contours of the real-world route that the vehicle is following, and via which the passenger can visualize the path and contours of the real-world route including but not limited to upcoming turns, hills, bumps, and dips in the road. Navigation system and vehicle system data may be input to the VR system and used in providing the preview information. A platform 1604 and anchored virtual content 1606 may also be displayed. Visual cues for upcoming maneuvers may also be displayed with the track 1608; for example, a gate 1610 or other visual cue may be displayed to indicate an upcoming stop, for example a stop sign or light on the route; the gate 1610 may remain until the vehicle is ready to move again. Audio and/or haptic cues may also be provided.

In some embodiments, if the VR system detects that a passenger may be beginning to experience motion sickness, some content may be removed from the VR environment to thus provide fewer, low-key visual objects flowing past the passenger in the virtual world. In some embodiments, as illustrated in FIG. 17, a low stimulation, sparse visual environment 1700 may be used to provide a soothing, relaxing experience. In some embodiments, an object or aspect may be displayed in the virtual environment that is anchored to a real world direction (e.g., a setting sun anchored at due west, or a tall building anchored at due north) so that the passenger may more easily track where they are in the real world. For example, a VR environment 1700 that shows a sparse star field with a sunset anchor 1706 and a few, low-key visual objects flowing past may help passengers to orient themselves in the real world and may provide a comfortable, relaxing VR experience.

Experiencing strong optic flow in a virtual world consistently for an uninterrupted period (i.e. driving without stopping) can cause an illusory perception of motion in the opposite direction (i.e., backwards) when the vehicle stops. In some embodiments, a mitigation for optic flow/visual motion aftereffects can be provided to avoid this perception of motion when the vehicle stops. For example, a visual stimulus can be provided at or near stop/brake points in the drive to reduce this effect. In some embodiments, the visual stimulus may be motion cues that flow opposite (i.e., forwards) to the perceived backwards motion; the motion cues may counteract the perception of moving backwards. The motion cues may, for example, be objects that are still moving forwards, past the passenger, moving slowly and slowing down over a few seconds to a complete stop. This makes the passenger perceive that they are drifting forwards, which counteract illusion of moving backwards. As another example of a visual cue that may be used to mitigate optic flow/visual motion aftereffects, contrast of the virtual world can be toned down, as the illusion of backwards motion may be more likely with higher contrast.

Passengers may find it uncomfortable to have visual input that does not match the real-world environmental noises that they hear. Thus, in some embodiment, audio (e.g., music, sound effects, white noise, etc.) may be provided to complement the visual experience provided by the VR application, for example through headphones or earbuds that block or cancel road noises and other real world environmental noises.

FIGS. 18 through 20 illustrate monitoring passengers when using the VR system in a moving vehicle and adapting the VR experience according to the passengers' preferences and physiological responses. The methods and apparatus illustrated in FIGS. 18 through 20 may, for example, be implemented in VR systems as illustrated in FIGS. 1 through 14.

FIG. 18 illustrates monitoring a passenger 1890 using a VR system in a vehicle, according to some embodiments. The virtual content 1840 and audio 1842 generated by a VR application executing on a VR controller 1810 and presented to a passenger 1890 via a HMD 1820 may be adapted to the particular passenger 1890 according to the passenger's preferences and/or according to passenger sensor data 1830 collected by sensors in the vehicle. In some embodiments, a VR application may initialize a VR environment for the passenger 1890 according to predefined or predetermined passenger preferences, for example passenger preference data maintained in a preferences file stored on the controller 1810 or accessed from external storage such as cloud storage. In some embodiments, the VR system may provide an interface that allows the passenger 1890 to specify their preferences for a VR environment to be experienced (e.g., the passenger may request a relaxing, normal, or exciting experience).

In some embodiments, while using the HMD 1820 to experience the VR world generated by the VR application on the VR controller 1810, various sensors may be used to monitor the passenger 1890 for signs of discomfort or motion sickness (e.g., paleness, sweating, fidgeting, swallowing, burping, pulse rate, breath rate, eye motions, etc.); the passenger sensor data 1830 may be provided to the VR controller 1810 via wired or wireless connections. In some embodiments, the sensors may include sensors 1832 in or on the HMD 1820, for example internal cameras that monitor the passenger's eyes or other portions of the passenger's face, external cameras that monitor other parts of the passenger's body such as the arms and hands, IMUs that detect and track motion of the passenger's head, and/or sensors that monitor physiological responses such as sweating, swallowing, and breath rate. In some embodiments, the sensors may include sensors 1834 attached to or worn on other parts of the passenger's body, for example wrist bands, arm bands, or watches that monitor sweating, pulse rate, swallowing, or other physiological responses, and/or that include IMUs that detect and track motion of the passenger's body. In some embodiments, the sensors may include sensors 1836 in the seat that, for example, detect motion and weight distribution of the passenger that may, for example, be used to determine that the passenger is fidgeting or restless. In some embodiments, the sensors may include cameras 1838 in the vehicle that capture video of the passenger that may, for example, be used to detect motions and responses (e.g., swallowing, burping, etc.) of the passenger.

If signs of motion sickness are detected, for example if analysis of the passenger sensor data 1830 by the VR controller 1810 suggests that the passenger appears to be fidgety, is closing their eyes, or is swallowing or burping frequently, the VR application executing on the VR controller 1810 may alter the virtual environment generated by the application to accommodate the passenger and to mitigate motion sickness. For example, the application may return to or maintain a 1:1 mapping to real life motions and accelerations in the simulated view displayed to the passenger. The VR application may also alter the virtual experience presented to the passenger using one or more of the visual and audio accommodations as described above, for example by displaying a virtual platform below the user, displaying engaging virtual content in front of the user, displaying anchored content in the virtual environment, reducing the content used to provide optical flow past the passenger, providing visual cues for upcoming vehicle maneuvers, displaying a virtual track, reducing the virtual world to a low stimulation, sparse visual environment that may provide a soothing, relaxing experience, providing visual stimuli to counteract optic flow/visual motion aftereffects, and/or playing soothing audio to block road noises. If the passenger exhibits no signs of motion sickness, the VR system may vary from the 1:1 mapping, which allows more flexibility in the virtual experience. For example, visual and other cues that provide the sense of acceleration may be increased in the virtual experience to make it feel to the passenger that they are accelerating at a rate faster than the vehicle is actually accelerating, and/or visual and other cues that provide the sense of a turn may be increased in the virtual experience to make it feel to the passenger that they are turning at a rate faster than the vehicle is actually turning. In addition, one or more of the accommodations for comfort and mitigating motion sickness as previously described may not be displayed or may be removed from the environment based on the passenger's lack of motion sickness, preferences, and/or input to the VR system.

FIG. 19 illustrates an example VR application that adapts a VR experience to accommodate a passenger based on passenger preferences and passenger sensor data, according to some embodiments. A VR application 1912 may include, but is not limited to, an accommodation decision module 1914, a VR rendering module 1916, and an audio module 1918. The VR application 1912 may also encode or have access to accommodation guidelines 1920 that specify one or more of the accommodations described above in reference to FIGS. 15 through 17. The accommodation decision module may set an initial VR environment for a passenger according to the passenger's preferences. For example, a passenger may be prone to motion sickness, and thus their preferences may specify that they prefer a calm, soothing virtual experience. Thus, the accommodation decision module may determine one or more accommodations to be set for the passenger based on the accommodation guidelines 1920. Alternatively, a passenger may not be prone to motion sickness, and thus their preferences may specify that they would prefer an exciting virtual experience. Other preferences may also be specified, for example audio preferences. Initial accommodation settings may be provided to the VR rendering module 1916. The VR rendering module 1916 may then generate virtual content 1940 representing an immersive VR environment adapted to the passenger according to the current accommodation settings and based at least in part on navigation and terrain data and vehicle sensor data obtained from the vehicle sensors and systems. In rendering the virtual content, the VR rendering module 1916 synchronizes the VR environment with motions and accelerations of the vehicle (e.g., turns, accelerations, stops, etc.) as determined from the inputs. The audio module 1918 may also generate audio 1942 adapted to the passenger on the current accommodation settings.

The accommodation decision module 1914 may monitor the passenger to detect signs of motion sickness, for example using passenger sensor data obtained from various sensors as illustrated in FIG. 18. If the accommodation decision module 1914 detects signs of motion sickness, then the accommodation decision module 1914 may determine one or more accommodations to be set for the passenger based on the accommodation guidelines 1920. The accommodation settings may be altered to accommodate the passenger and to mitigate motion sickness, and the VR rendering module 1916 may begin to generate and display virtual content and audio according to the altered settings and accommodations. For example, the VR rendering module 1916 may return to or maintain a 1:1 mapping to real life motions and accelerations in the simulated view displayed to the passenger. The VR rendering module 1916 may also alter the virtual experience presented to the passenger using one or more of the visual and audio accommodations as described above, for example by displaying a virtual platform below the user, displaying engaging virtual content in front of the user, displaying anchored content in the virtual environment, reducing the content used to provide optical flow past the passenger, providing visual cues for upcoming vehicle maneuvers, displaying a virtual track, reducing the virtual world to a low stimulation, sparse visual environment that may provide a soothing, relaxing experience, providing visual stimuli to counteract optic flow/visual motion aftereffects, and/or playing soothing audio to block road noises. In some embodiments, if the passenger exhibits no signs of motion sickness, the accommodation decision module 1914 may alter the settings to vary from the 1:1 mapping, which allows more flexibility in the virtual experience. For example, visual and other cues that provide the sense of acceleration may be increased in the virtual experience to make it feel to the passenger that they are accelerating at a rate faster than the vehicle is actually accelerating, and/or visual and other cues that provide the sense of a turn may be increased in the virtual experience to make it feel to the passenger that they are turning at a rate faster than the vehicle is actually turning. In addition, one or more of the accommodations for comfort and mitigating motion sickness as previously described may not be displayed or may be removed from the virtual environment based on the passenger's lack of motion sickness, preferences, and/or input to the VR application 1912.

FIG. 20 is a flowchart of a method for adapting a VR experience to accommodate a passenger based on passenger preferences and passenger sensor data, according to some embodiments. As indicated at 2010, a VR application executing on a VR controller of a VR system in a vehicle may set an initial VR environment for a passenger according to the passenger's preferences. For example, a passenger may be prone to motion sickness, and thus their preferences may specify that they prefer a calm, soothing virtual experience. Alternatively, a passenger may not be prone to motion sickness, and thus their preferences may specify that they would prefer an exciting virtual experience. Other preferences may also be specified, for example audio preferences. As indicated at 2020, the VR application may then generate virtual content and audio representing an immersive VR environment according to the current settings and based at least in part on inputs from the vehicle sensors and systems including but not limited to navigation/route data, terrain contour data, and vehicle sensor data. In rendering the virtual content, the VR application synchronizes the VR environment with motions and accelerations of the vehicle (e.g., turns, accelerations, stops, etc.) as determined from the inputs. As indicated at 2030, the VR controller sends the virtual content and audio to the VR device used by the passenger (e.g., a HMD worn by the passenger).

As indicated at 2040, the VR system may monitor the passenger to detect signs of motion sickness, for example using various sensors as illustrated in FIG. 18. At 2050, if motion sickness is detected, then the VR environment may be altered to accommodate the passenger and to mitigate motion sickness, and the method returns to element 2020 to generate and display virtual content and audio according to the altered settings and accommodations. For example, the application may return to or maintain a 1:1 mapping to real life motions and accelerations in the simulated view displayed to the passenger. The VR application may also alter the virtual experience presented to the passenger using one or more of the visual and audio accommodations as described above, for example by displaying a virtual platform below the user, displaying engaging virtual content in front of the user, displaying anchored content in the virtual environment, reducing the content used to provide optical flow past the passenger, providing visual cues for upcoming vehicle maneuvers, displaying a virtual track, reducing the virtual world to a low stimulation, sparse visual environment that may provide a soothing, relaxing experience, providing visual stimuli to counteract optic flow/visual motion aftereffects, and/or playing soothing audio to block road noises. At 2050, if no signs of motion sickness are detected, the method returns to element 2020 to continue generating and displaying virtual content and audio according to the current settings. In some embodiments, if the passenger exhibits no signs of motion sickness, the VR system may vary from the 1:1 mapping, which allows more flexibility in the virtual experience. For example, visual and other cues that provide the sense of acceleration may be increased in the virtual experience to make it feel to the passenger that they are accelerating at a rate faster than the vehicle is actually accelerating, and/or visual and other cues that provide the sense of a turn may be increased in the virtual experience to make it feel to the passenger that they are turning at a rate faster than the vehicle is actually turning. In addition, one or more of the accommodations for comfort and mitigating motion sickness as previously described may not be displayed or may be removed from the environment based on the passenger's lack of motion sickness, preferences, and/or input to the VR system.

Content for VR Systems in Vehicles

In some embodiments, virtual content developers may create VR content that may be used in VR systems in vehicles as described herein. VR content may be provided by the VR system provider or by third parties. For example, developers may create VR applications that can be executed on the VR controller to provide unique VR experiences to passengers through the VR system in a vehicle. For example, an entertainment studio may develop VR applications that allow passengers to experience a virtual environment based on a motion picture or motion picture franchise produced or owned by the studio when riding in a vehicle. The VR experience provided by a VR application may include modular elements or segments that can be matched to a variety of trip durations and route configurations. The VR applications may, for example, be purchased and downloaded to VR systems through an online store or site. The online store may, for example, be provided by the VR system provider. An interface to the online store may be provided through the VR system that allows a user to browse, select, purchase, and download VR applications from the online store. The VR system provider may receive a portion of for each purchase through the online store.

In some embodiments, the VR system as described herein may allow a user to build or customize a virtual environment along a route or routes, for example along frequently traveled routes, that can then be experienced by the user, shared with other persons in the same vehicle, or provided to others (e.g., via an online VR environment sharing website) that can then experience the virtual environment in their own vehicles. For example, the VR system may allow a user to interact with a virtual environment using gestures, voice commands, or inputs to an input device to add, remove, or modify virtual content in the virtual environment. For example, a user may add virtual buildings or other structures along the virtual representation of a route that the user frequently travels, throw virtual seeds or place virtual trees along the virtual representation of the route, or to customize or interact with the virtual representation of the route in other ways. As the user travels the route in a vehicle using the VR system to experience the VR environment, the user may see the results of their interactions, for example virtual plants growing up from the virtual seeds that they have previously thrown out, the virtual structures or trees that they have placed, and so on. Other people that travel the same route may obtain the customized VR environment directly from the user, through a web site, or through some other source, load the VR environment into the VR system in their vehicle, and experience the customized VR environment themselves. The customized VR environment may also be adapted to and experienced on other routes if desired.

Autonomous Vehicles

As previously noted, embodiments of the VR system as described herein may, for example, be implemented in autonomous or "self-driving" vehicles where all occupants are passengers. The VR system may enable safer, smaller, and less expensive autonomous vehicles. Windows in vehicles are inherently unsafe and not structurally sound, and add cost to vehicles. By providing a virtual view of the real environment or of a simulated environment, the VR system may reduce or eliminate the need for windows in autonomous vehicles, allowing the vehicles to be engineered with fewer and/or smaller windows, or with no windows at all. In addition, a VR experience provided through the VR system may provide passengers with the sensation that they are actually riding in a larger vehicle than the actual size of the autonomous vehicle, which may provide the passengers with a more pleasant and secure-feeling experience when riding in a small autonomous vehicle.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system, comprising:
a virtual reality (VR) controller in a vehicle, wherein the VR controller comprises one or more processors and memory configured to:
obtain inputs from one or more sources in a vehicle following an actual route in a real environment at a location;
select a route in another real location, wherein selection is based on comparing turns and curves of the route in the other real location to turns and curves of the actual route, and wherein the route in the other location is selected based at least in part on the turns and curves of the route in the other real location at least partially matching the turns and curves of the actual route;
render frames including virtual content having a virtual environment comprising a simulation of the selected route in the other real location, wherein the virtual environment includes a virtual view that is rendered based on the selected route in the other real location, and wherein, in rendering the frames, the VR controller synchronizes motions and accelerations of the virtual content with motions and accelerations of the vehicle traveling along the actual route based on the inputs from the one or more sources in the vehicle;
send the frames to a VR device for display to a passenger in the vehicle, wherein the frames are rendered and displayed to provide the virtual view of the virtual environment that replaces a view of the actual route in the real environment from the vehicle via the VR device.

2. The system as recited in claim 1, wherein the VR device includes a head-mounted device (HMD) that displays the frames to the passenger.

3. The system as recited in claim 1, wherein the view of the virtual environment includes visual cues to indicate motion of the vehicle to the passenger.

4. The system as recited in claim 1, wherein the one or more sources include:
one or more vehicle sensors, wherein the inputs from the vehicle sensors include one or more of depth map information from external vehicle sensors, localization information for the vehicle, video from one or more cameras on the vehicle, or motion and orientation information for the vehicle from an inertial-measurement unit (IMU) of the vehicle; and
one or more vehicle control systems, wherein the one or more vehicle control systems include one or more of a throttle control system, a brake control system, an active suspension control system, or a steering control system.

5. The system as recited in claim 1, wherein the one or more sources include sources external to the vehicle that are accessed through wireless connections, wherein inputs from the external sources include one or more of world map data, 3D models of a local environment, information about objects or features in the local environment, video streams, or audio.

6. The system as recited in claim 1, wherein the one or more sources include an inertial-measurement unit (IMU) of the VR device, wherein inputs from the IMU include motion and orientation information for the passenger's head.

7. The system as recited in claim 1, wherein the VR controller is further configured to:
determine that the selected route does not exactly match the actual route; and
modify the simulation of the selected route based on differences between the actual route and the selected route.

8. The system as recited in claim 1, wherein the VR controller is further configured to provide audio to the passenger through an audio system of the vehicle or through an audio system of the VR device.

9. The system as recited in claim 1, wherein the VR controller is further configured to signal vehicle control systems to cause the vehicle control systems to react within constraints to provide physical effects to the passenger, wherein the vehicle control systems include one or more of a throttle control system, a brake control system, an active suspension control system, or a steering control system.

10. The system as recited in claim 1, wherein the VR controller is further configured to signal an HVAC system of the vehicle to cause the HVAC system to change one or more of fan speed, temperature, or direction to provide physical effects to the passenger.

11. The system as recited in claim 1, wherein the VR controller is further configured to signal an active seat to cause the seat to move or tilt to provide physical effects to the passenger.

12. The system as recited in claim 1, wherein the VR controller is further configured to receive interactive inputs from the passenger and modify rendering of the frames including virtual reality content in response to the interactive inputs, wherein the interactive inputs include one or more of gestures, voice commands, or inputs to an input device.

13. The system as recited in claim 1, wherein the VR controller is further configured to render avatars of two or more passengers in the vehicle in the virtual environment, wherein the two or more passengers participate in the virtual environment via respective VR devices.

14. The system as recited in claim 1, wherein the VR controller is further configured to:
determine that the passenger is prone to or is exhibiting signs of motion sickness; and
upon determining that the passenger is prone to or is exhibiting signs of motion sickness, alter the virtual content according to one or more visual or audio accommodations to mitigate motion sickness of the passenger according to preference data for the passenger, wherein the one or more accommodations include:
displaying a ground plane beneath the passenger in the view of the virtual environment;
reducing visual cues that indicate motion of the vehicle in the virtual environment;
slowing the visual cues that indicate motion of the vehicle in the virtual environment so that there is a 1:1 ratio between motion in the virtual environment and motion in the real environment;
providing visual, audio, or haptic indications of upcoming vehicle maneuvers;
reducing the virtual content to provide a sparse visual environment;
placing an anchored object in the virtual environment that remains fixed relative to the real environment;
providing a visual stimulus at stops of the vehicle to counter visual motion aftereffects; or
providing audio output that blocks real world noise.

15. A method, comprising:
obtaining, by a virtual reality (VR) system in a vehicle, inputs from one or more sources in the vehicle following an actual route in a location;
selecting, by the VR system, a route in another real location, wherein selecting is based on comparing turns and curves of the route in the other real location to turns and curves of the actual route, and wherein the route in the other real location is selected based at least in part on the turns and curves of the route in the other real location at least partially matching the turns and curves of the actual route;
rendering, by the VR system, frames including virtual content having a virtual environment comprising a simulation of the route in the other real location, wherein the virtual environment includes a virtual view that is rendered based on the route in the other real location, and wherein, in rendering the frames, motions and accelerations of the virtual content are synchronized with motions and accelerations of the vehicle traveling along the actual route based on the inputs from the one or more sources in the vehicle; and
displaying, by the VR system, the frames to at least one passenger in the vehicle, wherein the displayed frames provide the virtual view of the virtual environment that replaces a view of the actual route in reality from the vehicle.

16. The method as recited in claim 15, wherein the VR system includes a VR controller and a VR device, wherein the VR device is one of a head-mounted device (HMD) worn by the passenger that displays the frames for viewing by the passenger or a projector that projects the frames to a window of the vehicle for viewing by the passenger, the method further comprising providing audio to the passenger through an audio system of the vehicle or through an audio system of the VR device.

17. The method as recited in claim 15, wherein the view of the virtual environment includes visual cues to indicate motion of the vehicle to the passenger.

18. The method as recited in claim 15, further comprising signaling one or more vehicle systems to provide physical effects to the passenger that correspond to the view of the virtual environment displayed to the passenger.

19. The method as recited in claim 15, further comprising receiving interactive inputs from the passenger and modifying rendering of the frames including virtual reality content in response to the interactive inputs.

20. The method as recited in claim 15, further comprising altering the virtual environment to accommodate the passenger according to preference data of the passenger upon determining that the passenger is prone to or is exhibiting signs of motion sickness.

* * * * *